US008281102B2

(12) United States Patent
Oe et al.

(10) Patent No.: US 8,281,102 B2
(45) Date of Patent: Oct. 2, 2012

(54) COMPUTER-READABLE RECORDING MEDIUM STORING MANAGEMENT PROGRAM, MANAGEMENT APPARATUS, AND MANAGEMENT METHOD

(75) Inventors: Kazuichi Oe, Kawasaki (JP); Tatsuo Kumano, Kawasaki (JP); Yasuo Noguchi, Kawasaki (JP); Yoshihiro Tsuchiya, Kawasaki (JP); Kazutaka Ogihara, Kawasaki (JP); Masahisa Tamura, Kawasaki (JP); Tetsutaro Maruyama, Kawasaki (JP); Takashi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 515 days.

(21) Appl. No.: 12/618,148

(22) Filed: Nov. 13, 2009

(65) Prior Publication Data
US 2010/0235604 A1 Sep. 16, 2010

(30) Foreign Application Priority Data
Mar. 11, 2009 (JP) .................................. 2009-57306

(51) Int. Cl.
G06F 12/00 (2006.01)

(52) U.S. Cl. ............ 711/170; 711/4; 711/100; 711/112; 711/114; 711/154; 711/156; 710/6; 710/19; 710/57; 715/700; 715/736

(58) Field of Classification Search .................. 711/170, 711/4, 100, 112, 114, 154, 156; 710/6, 19, 710/57; 715/700, 736
See application file for complete search history.

(56) References Cited

U.S. PATENT DOCUMENTS
| 7,392,362 | B2 * | 6/2008 | Yamauchi et al. | 711/170 |
| 8,069,191 | B2 * | 11/2011 | Revah et al. | 707/812 |
| 8,140,472 | B2 * | 3/2012 | Minamino et al. | 707/609 |
| 2003/0188085 | A1 | 10/2003 | Arakawa et al. | |
| 2005/0015547 | A1 | 1/2005 | Yokohata et al. | |
| 2009/0282287 | A1 * | 11/2009 | Oe et al. | 714/37 |

FOREIGN PATENT DOCUMENTS
JP 2003-296039 10/2003
JP 2005-50303 2/2005
* cited by examiner Primary Examiner — Stephen Elmore
(74) Attorney, Agent, or Firm — Staas & Halsey LLP

(57) ABSTRACT

A management apparatus and method that manage a storage system, in which an access node and a storage node, with which the management apparatus is in communication via the network. The management apparatus includes a logical volume judging unit that acquires a plurality of processing requests to each of the plurality of storage areas, references a logical volume allocation information storage unit that stores a correspondence relationship between the plurality of storage areas and the plurality of logical volumes in the storage node, and judges a logical volume corresponding to a storage area to become a processing object of each processing request, and a processing request breakdown calculating unit that counts an acquisition count of each processing request for each logical volume based on a judgment result by the logical volume judgment unit, and calculates a proportion of each acquisition count to a total of respective acquisition counts.

20 Claims, 20 Drawing Sheets

FIG. 7

120 ACCESS INFORMATION
STORAGE MODULE

121

ACCESS CONTROL TABLE

| LOGICAL VOLUME ID | SEGMENT ID | NODE ID | SLICE ID |
|---|---|---|---|
| L0 | 0 | SN-A | 1 |
| L0 | 1 | SN-B | 1 |
| L0 | 2 | SN-C | 1 |
| L0 | 3 | SN-A | 2 |
| L0 | 4 | SN-B | 2 |
| L0 | 5 | SN-C | 2 |
| L1 | 0 | SN-A | 3 |
| L1 | 1 | SN-B | 3 |
| ... | ... | ... | ... |

FIG. 10

160 ANALYZED LOAD INFORMATION STORAGE MODULE

| PER-SLICE SUMMARY TABLE | L0-0 | COLLECTION TIME SLOT: T1 |
|---|---|---|
| IO SIZE (BYTES) | NUMBER OF READS (DURING MEASUREMENT) | NUMBER OF WRITES (DURING MEASUREMENT) |
| 4 | 14 | 3 |
| 8 | 10 | 1 |
| 16 | 4 | 0 |
| 32 | 2 | 0 |
| 64 | 0 | 0 |
| 128 | 0 | 0 |
| 256 | 0 | 0 |
| 512 | 0 | 0 |
| TOTAL | 30 | 4 |

FIG. 12

| PER-STORAGE NODE SUMMARY TABLE | | | | | | | SN-A | | | COLLECTION TIME SLOT: T1 | |
|---|---|---|---|---|---|---|---|---|---|---|---|
| NUMBER OF WRITES (AT PEAK) | NUMBER OF L0 WRITES (DURING MEASUREMENT) | L0 LOAD (WRITE) | NUMBER OF L1 WRITES (DURING MEASUREMENT) | L1 LOAD (WRITE) | NUMBER OF L2 WRITES (DURING MEASUREMENT) | L2 LOAD (WRITE) | L0 LOAD (READ+WRITE) | L1 LOAD (READ+WRITE) | L2 LOAD (READ+WRITE) | | |
| 320 | 7 | 2% | 20 | 6% | 6 | 2% | 7% | 16% | 6% | | |
| 223 | 5 | 2% | 13 | 6% | 3 | 1% | 6% | 14% | 3% | | |
| 151 | 3 | 2% | 7 | 5% | 2 | 1% | 4% | 10% | 2% | | |
| 122 | 1 | 1% | 5 | 4% | 0 | 0% | 3% | 7% | 0% | | |
| 88 | 0 | 0% | 0 | 0% | 0 | 0% | 0 | 0 | 0 | | |
| 68 | 0 | 0% | 0 | 0% | 0 | 0% | 0 | 0 | 0 | | |
| 25 | 0 | 0% | 0 | 0% | 0 | 0% | 0 | 0 | 0 | | |
| 18 | 0 | 0% | 0 | 0% | 0 | 0% | 0 | 0 | 0 | | |
| — | — | 7% | — | 21% | — | 4% | 20% | 47% | 11% | | |

180 MEASURED LOAD INFORMATION STORAGE MODULE

MEASURED LOAD TABLE  181  182  183

| IO SIZE (BYTES) | READ iops (AT PEAK) | READ iops (DURING MEASUREMENT) | LOAD (READ) | WRITE iops (AT PEAK) | WRITE iops (DURING MEASUREMENT) | LOAD (WRITE) | LOAD (READ+WRITE) |
|---|---|---|---|---|---|---|---|
| | | | | | SN–A | | COLLECTION TIME SLOT: T1 |
| 4 | 425 | 83 | 20% | 315 | 25 | 8% | 28% |
| 8 | 413 | 60 | 15% | 211 | 14 | 7% | 22% |
| 16 | 375 | 26 | 7% | 148 | 10 | 7% | 14% |
| 32 | 319 | 15 | 5% | 119 | 3 | 3% | 8% |
| 64 | 266 | 0 | 0 | 86 | 0 | 0 | 0 |
| 128 | 137 | 0 | 0 | 65 | 0 | 0 | 0 |
| 256 | 98 | 0 | 0 | 22 | 0 | 0 | 0 |
| 512 | 57 | 0 | 0 | 17 | 0 | 0 | 0 |
| TOTAL | — | — | 47% | — | — | 25% | 72% |

COMPUTER-READABLE RECORDING MEDIUM STORING MANAGEMENT PROGRAM, MANAGEMENT APPARATUS, AND MANAGEMENT METHOD

CROSS-REFERENCE TO RELATED APPLICATIONS

This application is based upon and claims the benefit of priority of the prior Japanese Patent Application No. 2009-057306, filed on Mar. 11, 2009, the entire contents of which are incorporated herein by reference.

BACKGROUND

1. Field

Various embodiments described herein relate to a management program embodied in a computer readable medium, a management apparatus, and a management method for managing a storage system via a network.

2. Description of the Related Art

Currently, data processing using computers is being widely practiced, resulting in a greater significance being attached to storage technology for saving and utilizing data. In recent years, distributed storage systems are being constructed with the intention of increasing reliability when saving data and enabling data to be utilized at higher rates.

In a distributed storage system, a plurality of storage nodes and access nodes are connected via a network. A storage node includes a storage device and stores data. An access node accesses data stored in a storage node. An access node is capable of distributing and storing data across a plurality of storage nodes. Accordingly, load is distributed across a plurality of storage nodes and the speed of the system may be increased. In addition, an access node is capable of increasing the redundancy of data and allocating the data across a plurality of storage nodes. Accordingly, the reliability of data saving may be increased.

Moreover, in a distributed storage system, a single logical storage area (logical volume) may be set so as to straddle storage devices of a plurality of storage nodes. A plurality of logical volumes may be set, whereby, for example, a different logical volume may be used for each different service to be provided. Such an arrangement enables a plurality of services to enjoy the benefits of a distributed storage system.

Meanwhile, in system operation and management, monitoring is performed on loads generated at nodes making up the system. Load monitoring enables identification of nodes vulnerable to load concentration and nodes having unused processing capacity. Based on the result of such identification, tuning of the overall system, expansion of hardware resources, addition of functions, and the like may be performed in an appropriate manner depending on the usage of the respective nodes.

Load monitoring is also performed in distributed storage systems. In particular, at a storage node, monitoring the load on a storage device is important due to frequent reading/writing of data. Conceivable monitoring objects include storage area utilization (used amount). By monitoring storage area utilization, the occurrence of a shortage in a storage area may be prevented. For example, when used capacity exceeds a predetermined level at a specific storage node, it is conceivable that the data stored in the storage node in question be relocated to a storage node with spare storage area to equalize the used capacities of the respective storage nodes (Japanese Patent Laid-Open No. 2005-050303).

Another conceivable monitoring object is, for example, logical volume-specific utilization. By monitoring logical volume-specific utilization in each storage node, for example, service-specific usage can be known (Japanese Patent Laid-Open No. 2003-296039).

SUMMARY

In accordance with an aspect of embodiment, a management apparatus and method that manage a storage system, in which an access node and a storage node are in communication with each other via a network are provided. Data handled by the access node is stored in a plurality of storage areas associated with any of a plurality of logical volumes in the storage node, with which the management apparatus is in communication via the network, the management apparatus includes a logical volume judging unit that acquires a plurality of processing requests to each of the plurality of storage areas, references a logical volume allocation information storage unit that stores a correspondence relationship between the plurality of storage areas and the plurality of logical volumes in the storage node, and judges a logical volume corresponding to a storage area to become a processing object of each processing request; and a processing request breakdown calculating unit that counts an acquisition count of each processing request for each logical volume based on a judgment result by the logical volume judgment unit, and calculates a proportion of each acquisition count to a total of respective acquisition counts.

The object and advantages of the invention will be realized and attained by means of the elements and combinations particularly pointed out in the claims. It is to be understood that both the foregoing general description and the following detailed description are exemplary and explanatory and are not restrictive of the various embodiments, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 7 is a diagram illustrating a data structure example of an access control table;

FIG. 10 is a diagram illustrating a data structure example of a per-slice summary table;

FIG. 12 is a diagram illustrating a data structure example of a per-storage node summary table;

FIG. 13 is a diagram illustrating a data structure example of a measured load table;

DETAILED DESCRIPTION OF EMBODIMENTS

Figure 1:
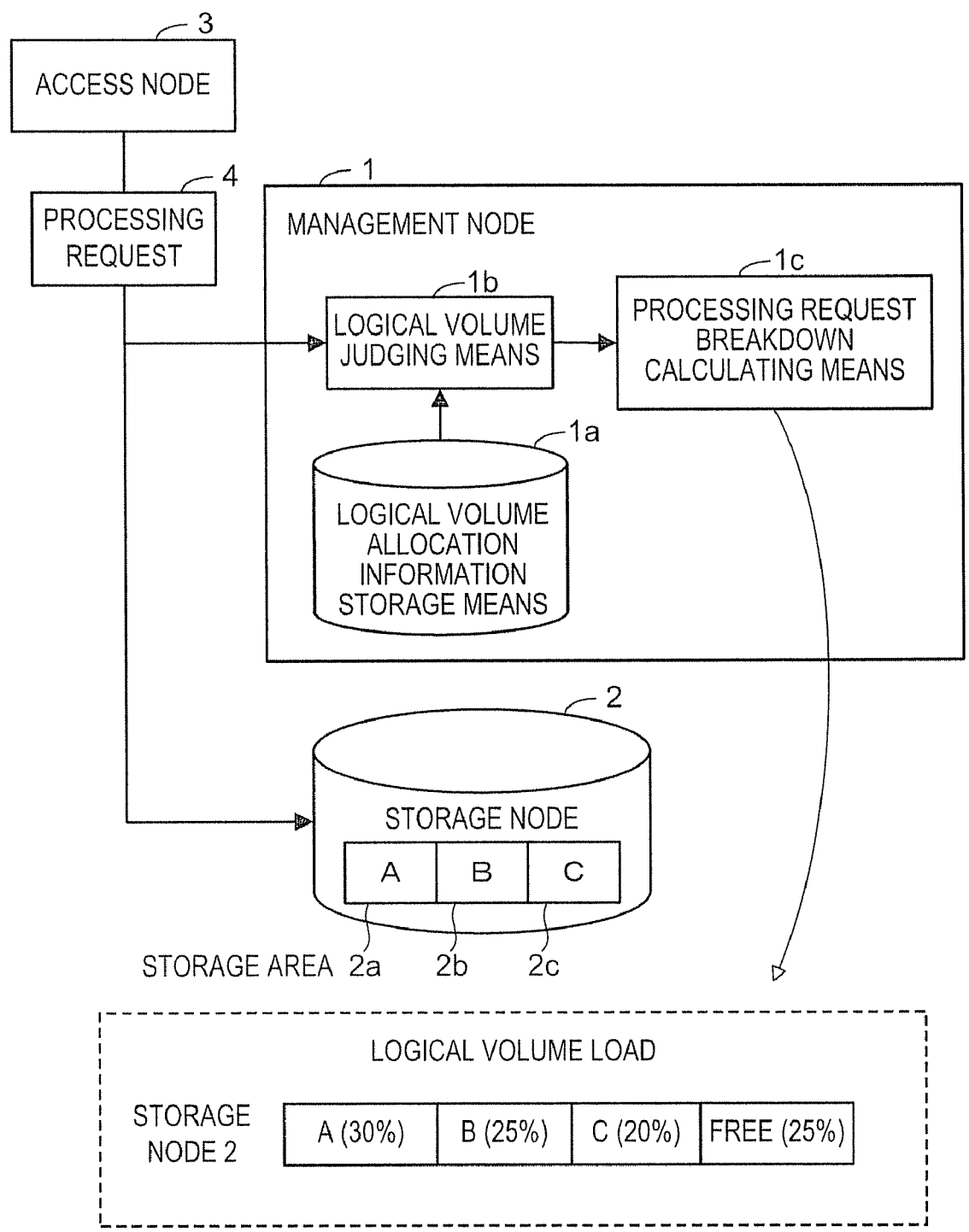
FIG. 1 is a diagram illustrating a storage system.

Reference will now be made in detail to the embodiments, examples of which are illustrated in the accompanying drawings, wherein like reference numerals refer to the like elements throughout. The embodiments are described below to explain the present invention by referring to the figures.

Acquiring logical volume-specific utilization in each storage node requires that each storage node be provided with a function enabling such utilization acquisition. Consequently, logical volume-specific utilization cannot be acquired at a storage not provided with such a function. In particular, in a distributed storage system, storage nodes may be added and updated in a fluid manner, and storage nodes of various models of diverse vendors may conceivably be connected. In this case, a management method dependent on the specific functions included in each model is problematic in that integrated management of the overall system is difficult to perform. On the other hand, adding such a function to a storage node requires cost.

The embodiment(s) have been made in consideration of the above and other problems existing in the typical system, and an object thereof is to provide a management program, a management apparatus, and a management method capable of readily acquiring logical volume-specific loads of a storage node regardless of the presence or absence of a logical volume management function of the storage node.

Hereinafter, an embodiment of the present invention will be described in detail with reference to the drawings. FIG. 1 is a diagram illustrating a storage system. The storage system includes a management node 1, a storage node 2, and an access node 3. The management node 1, the storage node 2, and the access node 3 are connected so as to be capable of communicating with each other by a wired or wireless network. The management node 1 is an operation and management terminal device for managing the storage system. The storage node 2 stores data handled by the access node 3. The access node 3 accesses data stored in the storage node 2. The management node 1 particularly monitors the load on a storage device included in the storage node 2. The load on the storage device is attributable to data access performed by the access node 3. A physical area of the storage device is divided into storage areas 2a, 2b, and 2c which are respectively associated with logical volumes A, B, and C. To access data, the access node 3 transmits a processing request 4 to the storage node 2. At this point, the processing request 4 is respectively transmitted to the storage areas 2a, 2b, and 2c. In other words, the access node 3 specifies a storage area containing data to be accessed and transmits the processing request 4.

The management node 1 includes logical volume allocation information storage module 1a, logical volume judging module 1b, and processing request breakdown calculating module 1c. The logical volume allocation information storage module 1a stores a correspondence relationship between the storage areas 2a, 2b, and 2c and the logical volumes A, B, and C within the storage node.

The logical volume judging module 1b acquires a plurality of processing requests made to the storage areas 2a, 2b, and 2c. The logical volume judging module 1b references the logical volume allocation information storage module 1a and judges a logical volume corresponding to a storage area to become a processing object of each processing request.

Based on a result of the judgment made by the logical volume judging module 1b, the processing request breakdown calculating module 1c counts an acquisition count of each processing request for each of the logical volumes A, B, and C, and calculates a proportion of each acquisition count to a total of the respective acquisition counts. The acquisition count becomes a value indicating a load generated at the logical volumes A, B, and C of the storage node 2 in response to the plurality of processing requests acquired by the logical volume judging module 1b. In addition, the proportion of an acquisition count becomes a value indicating a breakdown of loads generated at the logical volumes A, B, and C.

According to the management node 1, a plurality of processing requests made to the storage areas 2a, 2b, and 2c is acquired by the logical volume judging module 1b. Next, the logical volume allocation information storage module 1a is referenced by the logical volume judging module 1b and a logical volume corresponding to a storage area to become a processing object of each processing request is judged (determined). Subsequently, the processing request breakdown calculating module 1c counts an acquisition count of each processing request for each of the logical volumes A, B, and C, and calculates the proportion of each acquisition count to a total of the acquisition counts.

For example, peak acquisition counts of processing requests made to the logical volumes A, B, and C are obtained in advance using the method described above. During load measurement, acquisition counts of processing requests made to the logical volumes A, B, and C are then obtained according to the method described above. In this manner, loads on the logical volumes A, B, and C with respect to peaks thereof may be respectively obtained as, for example, 30%, 25%, and 20% (25% free). In addition, by calculating a breakdown of loads, it is possible to judge which of the logical volumes has a greater load.

Accordingly, logical volume-specific loads may be readily acquired regardless of the logical volume management function of the storage node. Specifically, a processing request 4 is acquired, and based on a storage area specified by the processing request 4, an evaluation is performed regarding at which logical volume among the entire storage node 2 a load had been generated. Therefore, the storage node 2 no longer requires a function for collecting logical volume-specific loads. In addition, since the function no longer need be added, the cost for adding the function also becomes unnecessary.

Even when the management node 1 estimates a load using the processing request 4 collected from the access node 3, an error may possibly occur between an estimated load and a load actually generated at the storage node 2. For example, even if a processing request 4 is transmitted from the access node 3 to the storage node 2, the processing request 4 may conceivably be retained in the network and require a long time to arrive at the storage node 2 or may end up being discarded before arriving at the storage node 2. In this case, since processing of the processing request 4 in question is not executed by the storage node 2, the load estimated by the management node 1 results in a value greater than the load actually generated by just that much.

In contrast, for example, a load obtained by the processing request breakdown calculating module 1c may conceivably be corrected using the measured load on the storage node 2. Specifically, the management node 1 acquires load information measured at the storage node 2, and based on the load information and a load breakdown obtained by the processing request breakdown calculating module 1c, acquires load information for each of the logical volumes A, B, and C. As measured load information generated at the storage node 2, let us assume that it was found that 70% of the entire hardware resource is being used (30% free). In this case, since the breakdown of loads on the logical volumes A, B, and C obtained by the processing request breakdown calculating module 1c is 6:5:4, loads on the logical volumes A, B, and C may be re-evaluated from the measured load information as being 28%, 23.3%, and 18.7% (30% free).

In this manner, loads on the logical volumes A, B, and C may conceivably be obtained at greater accuracy. The management node 1 is applicable to a distributed storage system having, for example, a plurality of storage nodes. In a distributed storage system, storage nodes may be added and updated in a fluid manner, and storage nodes of various models of diverse vendors may conceivably be connected. In this case, integrated management cannot be achieved by a management method dependent on the specific functions included in each model. On the other hand, the management node 1 enables monitoring of logical volumes through a model-independent method. Therefore, the management node 1 is particularly useful when applied to a distributed storage system.

Figure 2:
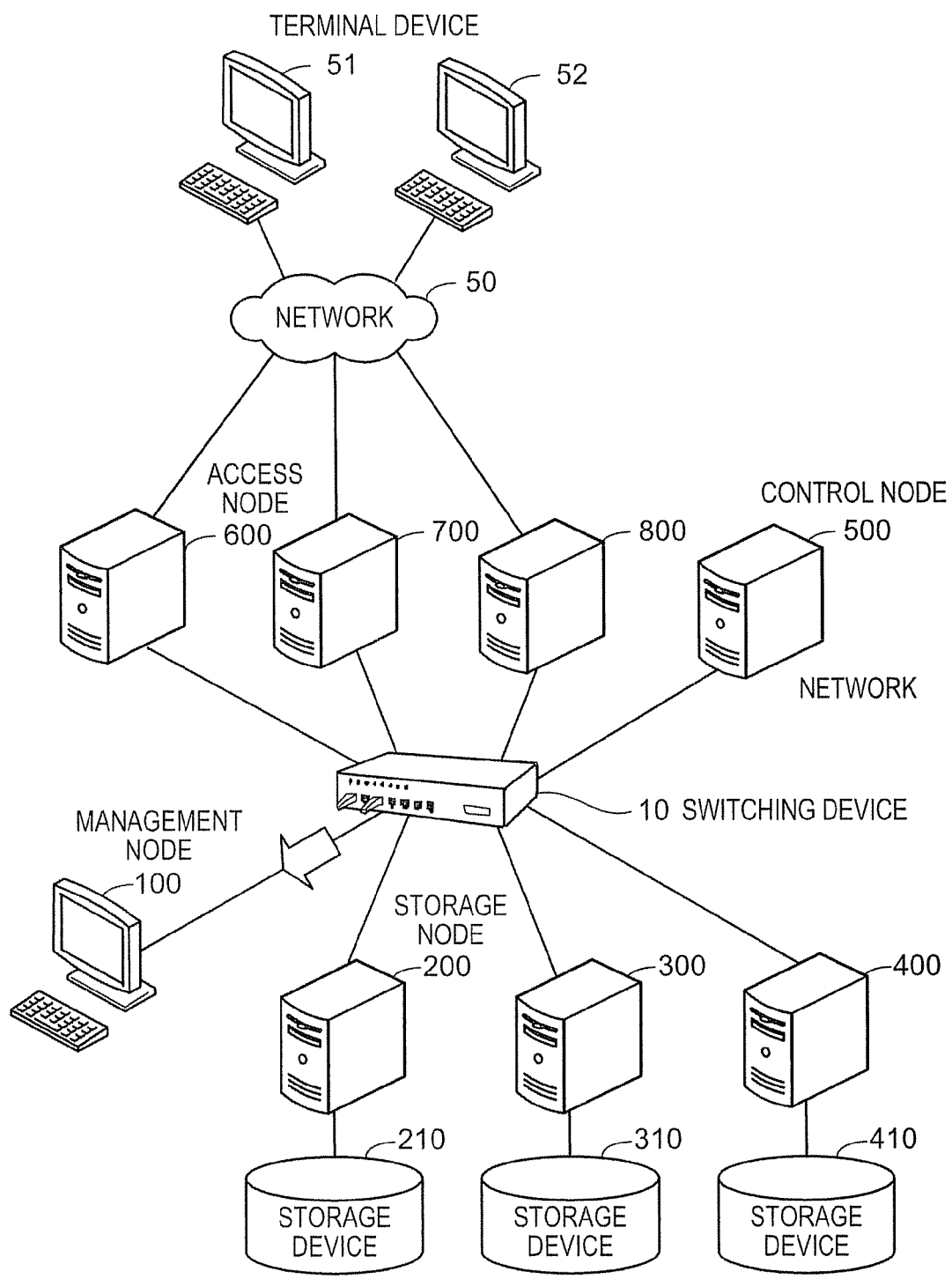
FIG. 2 is a diagram illustrating a configuration of a distributed storage system.

Hereinafter, a description will be given with greater specificity using a case where the management node 1 is applied to a distributed storage system. FIG. 2 is a diagram illustrating a configuration of a distributed storage system. A distributed storage system is a storage system whose reliability and processing capability have been enhanced by distributing and allocating a plurality of pieces of data with the same content to a plurality of storage nodes connected by a network. The distributed storage system includes a management node 100, storage nodes 200, 300, and 400, a control node 500, and access nodes 600, 700, and 800. The management node 100, the storage nodes 200, 300, and 400, the control node 500, and the access nodes 600, 700, and 800 are connected via a switching device 10 so as to be capable of performing data communication among each other. In addition, terminal devices 51 and 52 are connected to the access nodes 600, 700, and 800 via a network 50.

The management node 100 is an operation and management terminal device operated by an administrator of the distributed storage system. Using the management node 100, the administrator is able to monitor the usage of the storage nodes 200, 300, and 400, the control node 500, and the access nodes 600, 700, and 800. In addition, by operating the management node 100, the administrator is able to access the storage nodes 200, 300, and 400, the control node 500, and the access nodes 600, 700, and 800 to perform various settings necessary for system operation.

Due to a port-mirroring function or the like included in the switching device 10, the management node 100 receives request packets (hereinafter simply referred to as packets) sent to the storage nodes 200, 300, and 400 from the access nodes 600, 700, and 800.

Storage devices 210, 310, and 410 are respectively connected to the storage nodes 200, 300, and 400. The storage devices 210, 310, and 410 are, for example, RAID (Redundant Arrays of Independent Disks) systems using a plurality of built-in HDDs (Hard disk Drives). The storage nodes 200, 300, and 400 provide data stored in the storage devices 210, 310, and 410 to the access nodes 600, 700, and 800 via the switching device 10.

The control node 500 manages the storage nodes 200, 300, and 400. Specifically, the control node 500 retains a logical volume indicating a data allocation status. The control node 500 acquires information regarding data management from the storage nodes 200, 300, and 400, and updates the logical volume as required. In addition, when the logical volume is updated, the control node 500 notifies the update's contents to affected storage nodes. Details of the logical volume are described in detail below.

The access nodes 600, 700, and 800 provide the terminal devices 51 and 52 an information processing service using data managed by the storage nodes 200, 300, and 400. In other words, the access node 600 executes a predetermined program in response to a request from the terminal devices 51 and 52, and accesses the storage nodes 200, 300, and 400 as necessary. In this case, the access nodes 600, 700, and 800 acquire a logical volume from the control node 500 and, based on the acquired logical volume, identify a storage node to be accessed.

Figure 3:
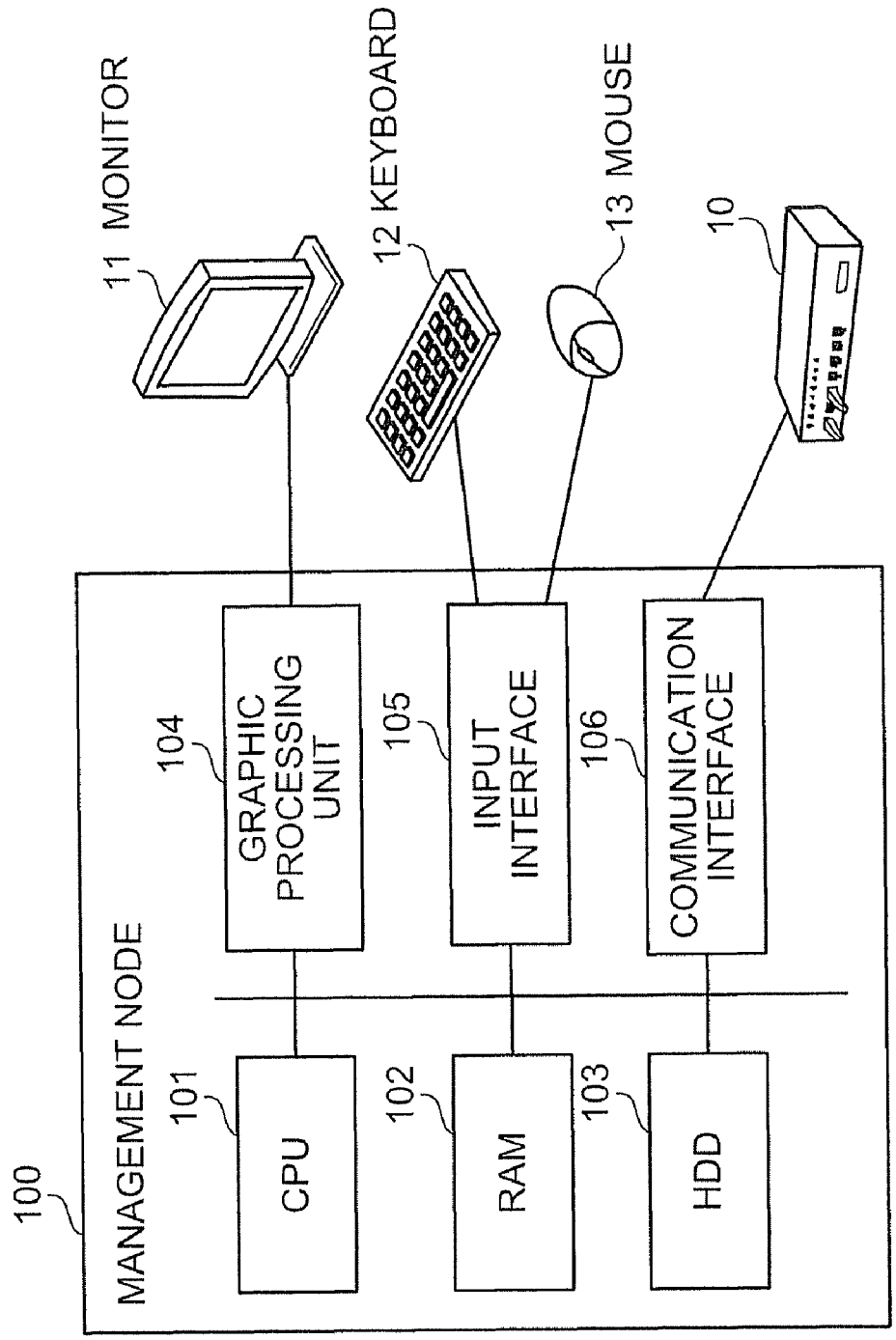
FIG. 3 is a diagram illustrating a hardware configuration of a management node.

FIG. 3 is a diagram illustrating a hardware configuration of a management node. The management node 100 includes a CPU (Central Processing Unit) 101, a RAM (Random Access Memory) 102, an HDD 103, a graphic processing unit 104, an input interface 105, and a communication interface 106.

The CPU 101 controls operations of the entire management node 100. The RAM 102 temporarily stores at least a portion of an OS (Operating System) program or an application software (hereinafter referred to as an application) program to be executed by the CPU 101. In addition, the RAM 102 stores various data required by processing performed by the CPU 101.

The HDD 103 stores an OS program and an application program. In addition, the HDD 103 stores various data required by processing performed by the CPU 101. Other non-volatile storage devices such as an SSD (Solid State Drive) may be used instead of the HDD 103.

The graphic processing unit 104 is connected to a monitor 11. The graphic processing unit 104 causes an image to be displayed on a screen of the monitor 11 according to an instruction from the CPU 101. The input interface 105 is connected to a keyboard 12 and a mouse 13. The input interface 105 transmits signals sent from the keyboard 12 or the mouse 13 to the CPU 101.

The communication interface 106 is connected to the switching device 10 and performs data transmission/reception to/from the storage nodes 200, 300, and 400, the control node 500, and the access nodes 600, 700, and 800.

Moreover, the control node 500, the access nodes 600, 700, and 800, and the terminal devices 51 and 52 may also be realized by the same hardware configuration as the management node 100. However, in addition to a communication interface for connecting to the switching device 10, the access nodes 600, 700, and 800 further include a communication interface for connecting to the network 50.

Figure 4:
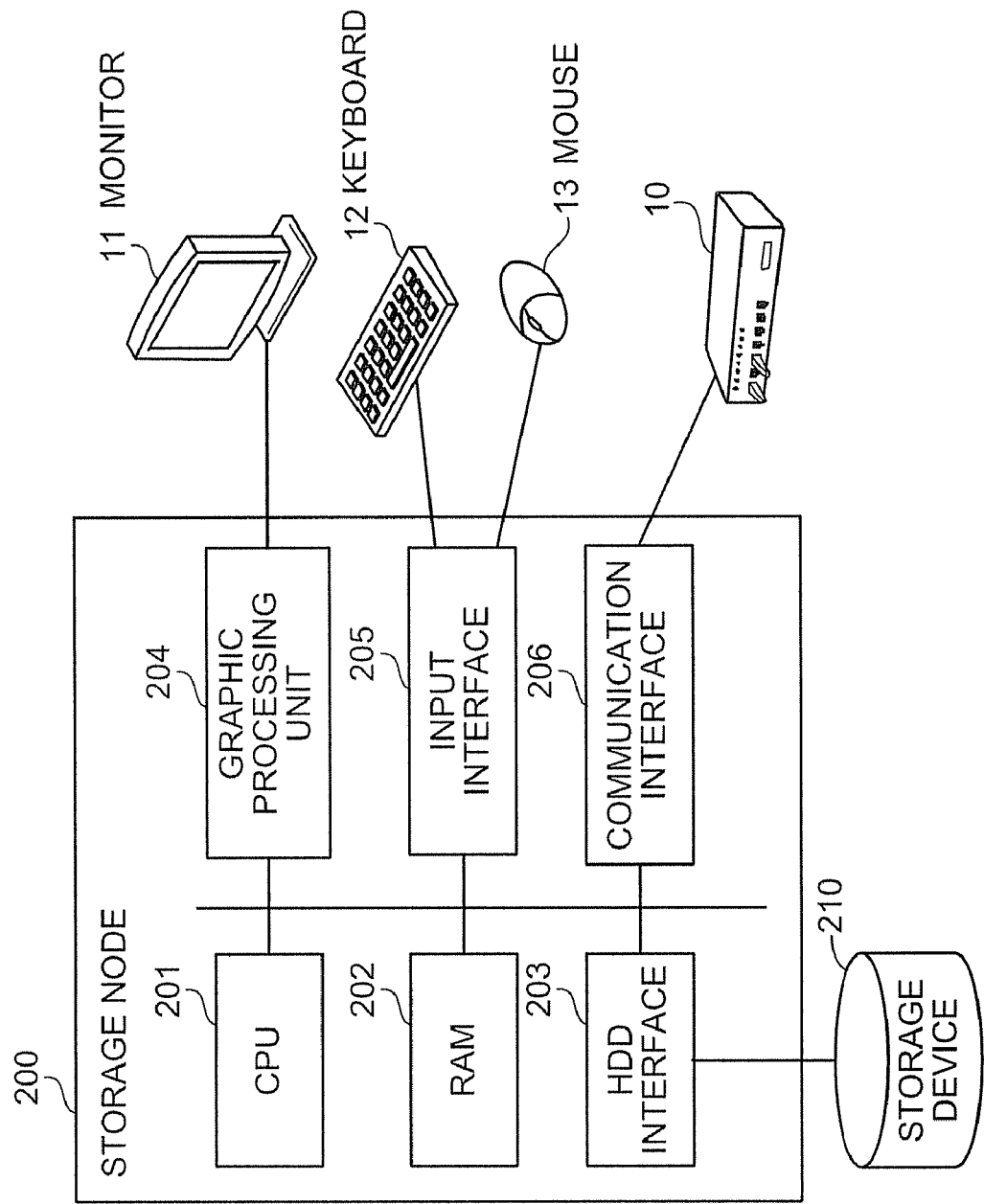
FIG. 4 is a diagram illustrating a hardware configuration of a storage node.

FIG. 4 is a diagram illustrating a hardware configuration of a storage node. The storage node 200 includes a CPU 201, a RAM 202, an HDD interface 203, a graphic processing unit 204, an input interface 205, and a communication interface 206.

The CPU 201 controls operations of the entire storage node 200. The RAM 202 temporarily stores at least a portion of an OS program or an application program to be executed by the CPU 201. In addition, the RAM 202 stores various data required by processing performed by the CPU 201.

The HDD interface 203 is connected to the storage device 210. The HDD interface 203 communicates with a RAID controller built into the storage device 210 and performs data input/output to/from the storage device 210. The RAID controller in the storage device 210 includes, for example, a function of any of RAID 0 to RAID 6, and collectively manages a plurality of HDDs as a single storage device. The storage device 210 stores an OS program and an application program. The OS program and the application program may alternatively be stored in, for example, another storage device separately provided at the storage node 200. In addition, the storage device 210 stores data to be handled by the access nodes 600, 700, and 800.

The graphic processing unit 204 is connected to a monitor 21. The graphic processing unit 204 causes an image to be displayed on a screen of the monitor 21 according to an instruction from the CPU 201. The input interface 205 is connected to a keyboard 22 and a mouse 23. The input interface 205 transmits signals sent from the keyboard 22 or the mouse 23 to the CPU 201.

The communication interface 206 is connected to the switching device 10 and performs data transmission/reception to/from the management node 100, the storage nodes 300 and 400, the control node 500, and the access nodes 600, 700, and 800.

The storage nodes 300 and 400 may also be realized by a similar hardware configuration as the storage node 200. Next, a logical volume that the control node 500 provides the access nodes 600, 700, and 800 will be described. A logical volume is a virtual volume for enabling data dispersion-managed by the storage nodes 200, 300, and 400 to be readily used from the access nodes 600, 700, and 800.

Figure 5:
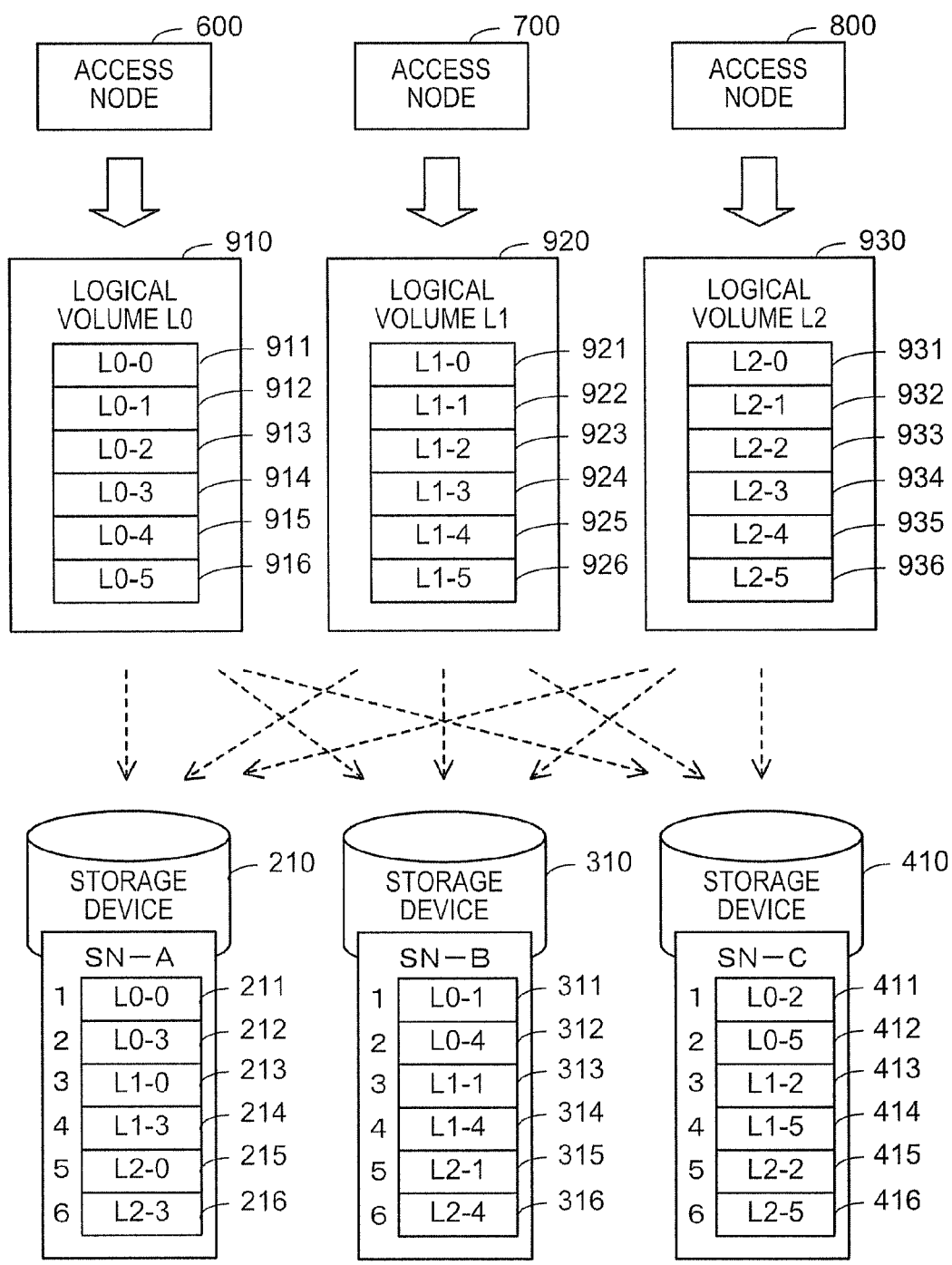
FIG. 5 is a diagram illustrating a configuration example of a logical volume.

FIG. 5 is a diagram illustrating a configuration example of a logical volume. The present distributed storage system includes logical volumes 910, 920, and 930. The logical volume 910 is assigned a logical volume ID of "L0". The logical volume 910 is divided into and managed as six segments: 911 to 916. With respect to the logical volume ID "L0", the segments 911 to 916 are respectively assigned segment IDs "0" to "5".

The logical volume 920 is assigned a logical volume ID of "L1". The logical volume 920 is divided into and managed as six segments: 921 to 926. With respect to the logical volume ID "L1", the segments 921 to 926 are respectively assigned segment IDs "0" to "5".

The logical volume 930 is assigned a logical volume ID of "L2". The logical volume 930 is divided into and managed as six segments: 931 to 936. With respect to the logical volume ID "L2", the segments 931 to 936 are respectively assigned segment IDs "0" to "5".

In addition, the storage node 200 is assigned a node ID of "SN-A". The storage node 300 is assigned a node ID of "SN-B". The storage node 400 is assigned a node ID of "SN-C". The physical storage areas of the storage devices 210, 310, and 410 are respectively divided into and managed as six slices.

The storage area in the storage device 210 is divided into six slices: 211 to 216. With respect to the node ID "SN-A", the slices 211 to 216 are respectively assigned slice IDs "1" to "6".

The storage area in the storage device 310 is divided into six slices: 311 to 316. With respect to the node ID "SN-B", the slices 311 to 316 are respectively assigned slice IDs "1" to "6".

The storage area in the storage device 410 is divided into six slices: 411 to 416. With respect to the node ID "SN-C", the slices 411 to 416 are respectively assigned slice IDs "1" to "6".

The respective segments of the logical volumes 910, 920, and 930 are distributed and allocated among the respective slices of the storage devices 210, 310, and 410. For example, the segment 911 is allocated to the slice 211. The segment 912 is allocated to the slice 311. The segment 913 is allocated to the slice 411. The segment 914 is allocated to the slice 212. The segment 915 is allocated to the slice 312. The segment 916 is allocated to the slice 412.

In this manner, segments 911 to 916 of the logical volume 910 are allocated to slices whose slice IDs are "1" and "2" among the storage devices 210, 310, and 410. In addition, segments 921 to 926 of the logical volume 920 are allocated to slices whose slice IDs are "3" and "4" among the storage devices 210, 310, and 410. Furthermore, segments 931 to 936 of the logical volume 930 are allocated to slices whose slice IDs are "5" and "6" among the storage devices 210, 310, and 410.

A plurality of logical volumes may be created according to an intended end-usage of the data, access source authority, and the like. In this case, the logical volume 910 is only accessible from the access node 600. The logical volume 920 is only accessible from the access node 700. The logical volume 930 is only accessible from the access node 800. Slices not appearing on a logical volume cannot be recognized from the access nodes 600, 700, and 800. For example, among the slices of the storage device 210, the access node 600 is unable to recognize slices other than the slices 211 and 212 associated with the segments 911 and 914 of the logical volume 910. Therefore, differentiating the use of logical volumes also contributes to enhancing security.

Figure 6:
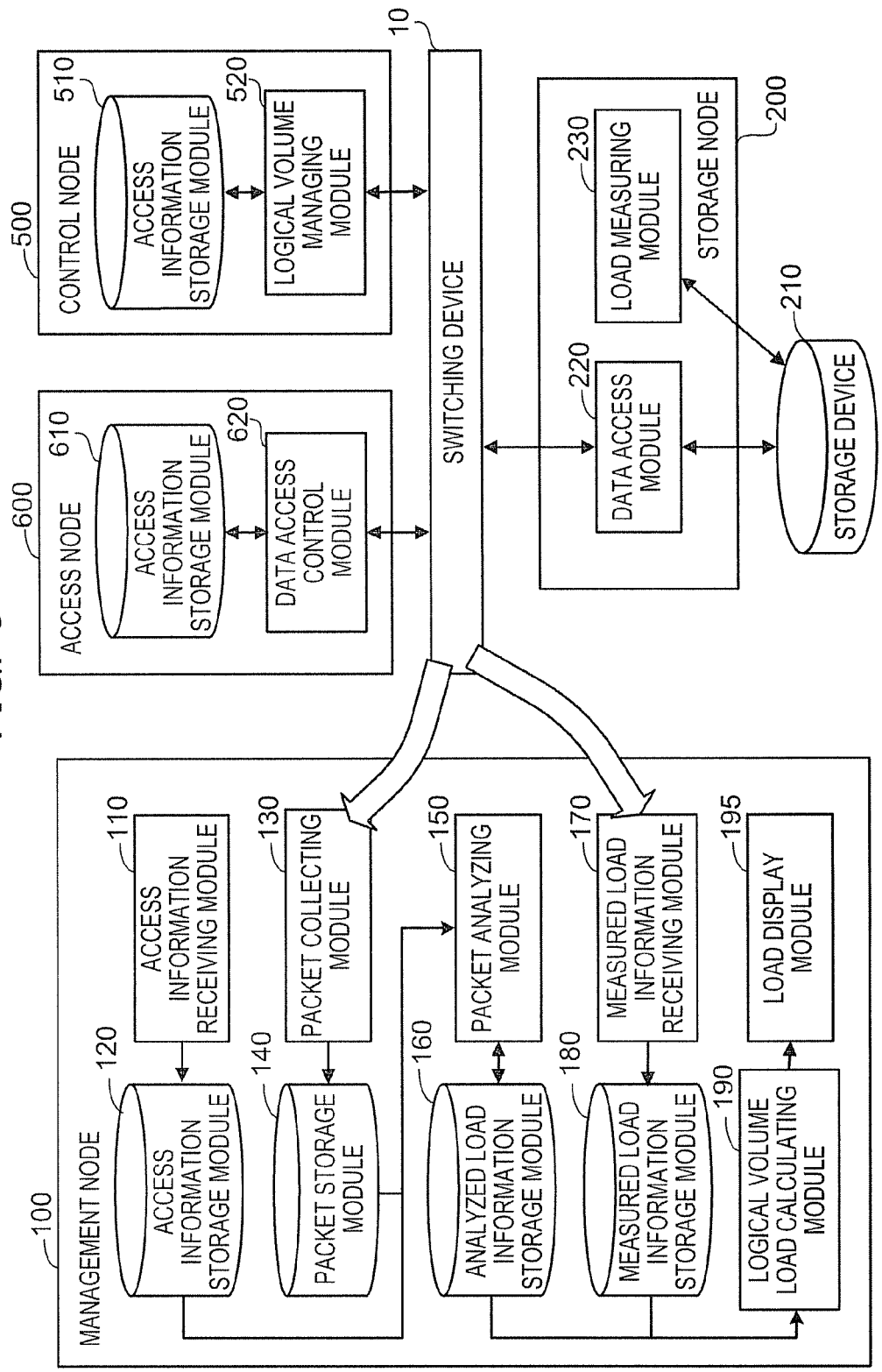
FIG. 6 is a diagram illustrating functional configurations of respective nodes.

FIG. 6 is a diagram illustrating functional configurations of the respective nodes. The management node 100 includes an access information receiving module 110, an access information storage module 120, a packet collecting module 130, a packet storage module 140, a packet analyzing module 150, an analyzed load information storage module 160, a measured load information receiving module 170, a measured load information storage module 180, a logical volume load calculating module 190, and a load display module 195. The functions of these modules are realized by the CPU 101 by executing a predetermined program. However, a portion of or all of the functions of these modules may alternatively be realized by dedicated hardware.

The access information receiving module 110 acquires, from the control node 500, access information used by the access nodes 600, 700, and 800 to access data of the storage nodes 200, 300, 400. Access information is a definition of the correspondence between the logical volume and slices set in the storage nodes 200, 300, and 400. The access information receiving module 110 stores the acquired access information in the access information storage module 120. The access information receiving module 110 attempts to, for example, receive access information periodically from the control node 500 so that the access information stored in the access information storage module 120 is always up to date.

The access information storage module 120 stores access information acquired by the access information receiving module 110. The packet collecting module 130 collects, from the switching device 10, packets forwarded from the access nodes 600, 700, and 800 to the storage nodes 200, 300, and 400. The packet collecting module 130 stores the collected packets in the packet storage module 140.

The packet storage module 140 stores packets collected by the packet collecting module 130. The packet analyzing module 150 analyzes packets stored in the packet storage module 140. A packet includes information specifying processing contents (read/write) and a slice of the storage node that is a processing request destination. Therefore, the packet analyzing module 150 is capable of evaluating load generated per-slice by referencing such information as well as access information stored in the access information storage module 120 and counting the number of packets to each slice.

A load obtained by analyzing a packet shall be referred to as per-slice analyzed load information. The packet analyzing module 150 stores per-slice analyzed load information in the analyzed load information storage module 160. In addition, based on per-slice analyzed load information, the packet analyzing module 150 is capable of evaluating an analyzed load generated per logical volume. The packet analyzing module 150 stores per-logical volume analyzed load information in the analyzed load information storage module 160.

The analyzed load information storage module 160 stores per-packet and per-logical volume analyzed load information evaluated by the packet analyzing module 150. The measured load information receiving module 170 receives load information measured at the storage nodes 200, 300, and 400. Hereinafter, load information measured in such a manner shall be referred to as measured load information.

Examples of load indexes comparable to an analyzed load obtained by the packet analyzing module 150 include iops (Input Output Per Second). iops is a representative index for evaluating a capability of a storage device and indicates a number of IOs executed by the storage device in one second (a number of data inputs/outputs per unit time). Generally, iops is considered to be linearly dependent on a number of packets (i.e., the number of requests) per unit time to the storage nodes 200, 300, and 400. Hereinafter, it is assumed that iops is included as a load index in load information to be received by the measured load information receiving module 170.

The measured load information receiving module 170 stores acquired measured load information in the measured load information storage module 180. The measured load information storage module 180 stores measured load information received by the measured load information receiving module 170.

The logical volume load calculating module 190 calculates the load (logical volume load) on the logical volumes 910, 920, and 930 based on analyzed load information stored in the analyzed load information storage module 160 and measured load information stored in the measured load information storage module 180. The logical volume load calculating module 190 outputs logical volume load calculation results to the load display module 195.

The load display module 195 displays contents of a logical volume load calculated by the logical volume load calculating module 190 on the monitor 11. Details of logical volume load display methods are described in detail below.

The storage node 200 includes a data access module 220 and a load measuring module 230. The storage nodes 300 and 400 share the same functional configuration. Upon accepting a packet from the access node 600, the data access module 220 references processing contents included in the packet and a slice that is an object, and operates data stored in the storage device 210.

Specifically, upon accepting a data read request specifying a slice from the access node 600, the data access module 220 reads data from the specified slice. The data access module 220 then transmits a read result to the access node 600. In addition, when accepting a data write request specifying a slice from the access node 600, the data access module 220 writes data into the specified slice in the storage device 210. The data access module 220 then transmits a write result to the access node 600.

The data access module 220 is capable of executing such data operations by referencing information that manages physical addresses of a storage area in the storage device 210 corresponding to each slice. Such information is managed at the storage node 200.

The load measuring module 230 measures a load generated on the storage device 210 due to data read processing executed in response to a read request or data write processing executed in response to a write request, and generates measured load information. The load measured by the load measuring module 230 includes iops described above. The load measuring module 230 stores the generated measured load information in a predetermined storage area in the storage device 210. The stored measured load information is transmitted to the management node 100 by the data access module 220 in response to a request from the management node 100. The function of the load measuring module 230 may be realized by, for example, a function normally included in an OS of the storage node 200.

The control node 500 includes an access information storage module 510 and a logical volume managing module 520. The access information storage module 510 stores access information. Access information stored in the access information storage module 510 is the master information of access information to be referenced by the respective nodes.

The logical volume managing module 520 manages slice configurations of the storage nodes 200, 300, and 400. The logical volume managing module 520 newly creates a logical volume based on, for example, an instruction from the management node 100. In addition, the logical volume managing module 520 updates access information stored in the access information storage module 510 based on, for example, an instruction from the management node 100. Furthermore, the logical volume managing module 520 transmits access information stored in the access information storage module 510 to the management node 100 in response to a request from the management node 100.

The access node 600 includes an access information storage module 610 and a data access control module 620. The access nodes 700 and 800 share the same functional configuration. The access information storage module 610 stores access information defining a correspondence between the logical volume and slices set in the storage nodes 200, 300, and 400.

The data access control module 620 identifies a storage node to become an access destination based on access information stored in the access information storage module 610. In other words, the data access control module 620 identifies a segment to which the data to be used belongs, and identifies a storage node that manages slices of the identified segment. Subsequently, the data access control module 620 accesses the identified storage node. At this point, in a case when access fails, it is conceivable that the data allocation status had been changed after a logical volume was acquired from the control node 500. In this case, the data access control module 620 acquires the latest access information from the control node 500 and updates contents stored in the access information storage module 610, and reattempts to access the storage node.

FIG. 7 is a diagram illustrating a data structure example of an access control table. An access control table 121 is stored in the access information storage module 120. In addition, the same data as the access control table 121 is stored in the access information storage modules 510 and 610. Among the data, the access control table stored in the access information storage module 510 becomes the master table and the access control tables stored in the access information storage modules 120 and 610 are updated accordingly.

The access control table 121 is provided with an item indicating a logical volume ID, an item indicating a segment ID, an item indicating a node ID, and an item indicating a slice ID. Pieces of information of the respective items aligned laterally are associated with each other to represent information regarding a single slice.

A logical volume ID that identifies a logical volume is set in the item indicating a logical volume ID. A segment ID that identifies a segment is set in the item indicating a segment ID. A node ID that identifies a node is set in the item indicating a node ID. A slice ID that identifies a slice is set in the item indicating a slice ID.

For example, information containing "L0" as a logical volume ID, "0" as a segment ID, "SN-A" as a node ID, and "1" as a slice ID is set to the access control table 121. This module that the segment 911 of the logical volume 910 is allocated to the slice 211 of the storage node 200.

Figure 8:
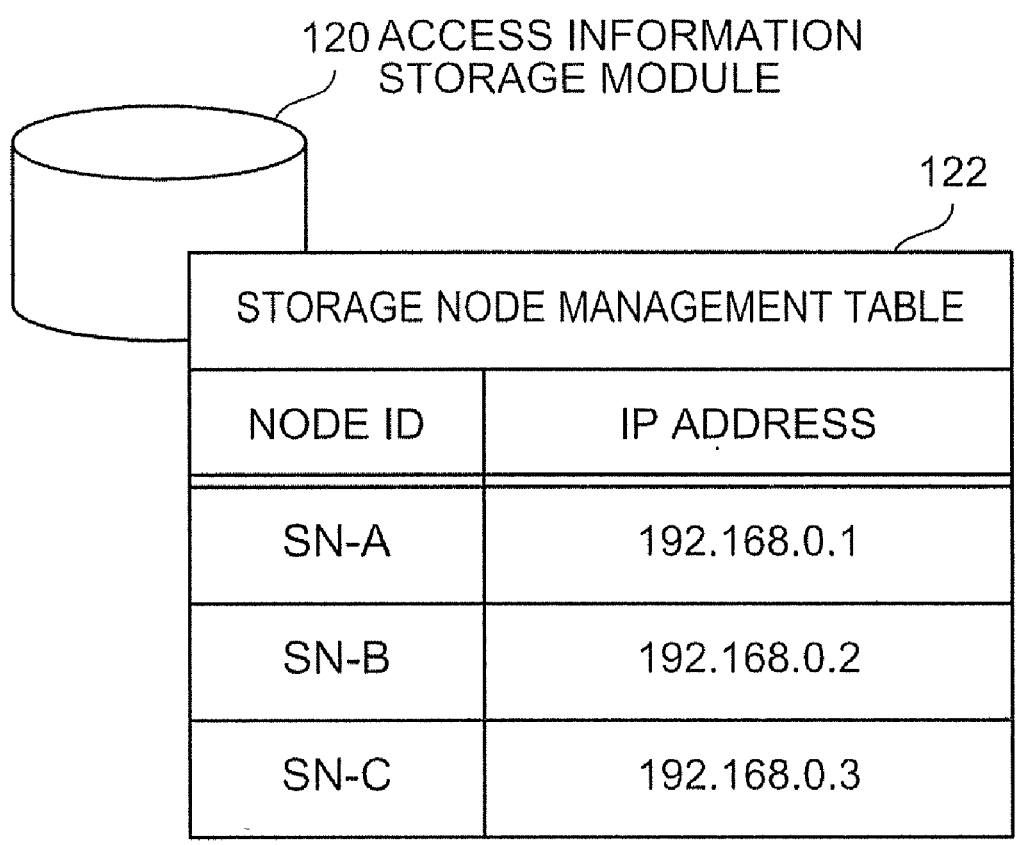
FIG. 8 is a diagram illustrating a data structure example of a storage node management table.

FIG. 8 is a diagram illustrating a data structure example of a storage node management table. A storage node management table 122 is stored in the access information storage module 120. In addition, the same data as the storage node management table 122 is stored in the access information storage modules 510 and 610. The storage node management table 122 is provided with an item indicating a node ID and an item indicating an IP (Internet Protocol) address. Pieces of information of the respective items aligned laterally are associated with each other to represent information regarding a single storage node.

A node ID that identifies a storage node is set in the item indicating a node ID. An IP address of a storage node is set in the item indicating an IP address. For example, information containing "SN-A" as a node ID and "192.168.0.1" as an IP address is set to the storage node management table 122. This module that the IP address of the storage node 200 is "192.168.0.1".

Figure 9:
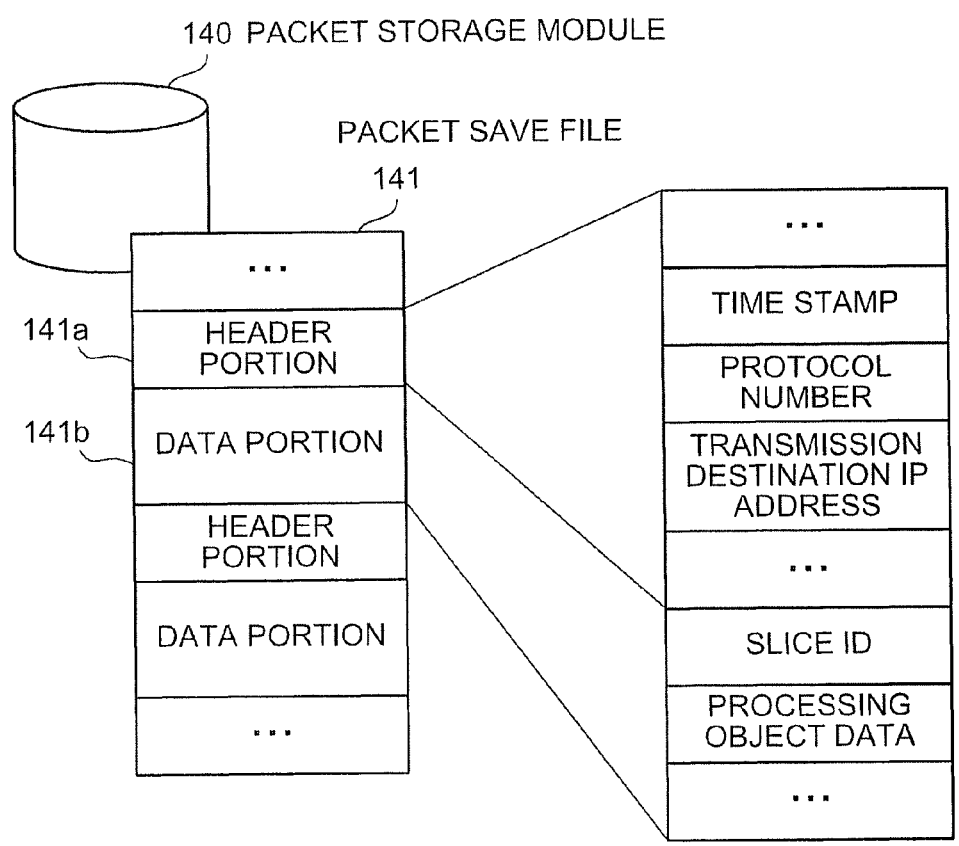
FIG. 9 is a diagram illustrating an exemplary structure of a packet.

FIG. 9 is a diagram illustrating an exemplary structure of a packet. Packets collected by the packet collecting module 130 are stored as a packet save file 141 in the packet storage module 140. A packet save file 141 is, for example, a binary file. A packet save file 141 stores information on a plurality of packets. The packet collecting module 130 generates the packet save file 141 from packets collected during, for example, a predetermined time slot T1.

Each packet has a header portion 141a and a data portion 141b. The header portion 141a includes an area indicating a time stamp, an area indicating a protocol number, and an area indicating a transmission destination IP address. Information indicating the time that the packet had been transmitted (for example, year, month, day, hour, minute, and second) is set in the area indicating a time stamp. The area indicating a protocol number stores information indicating the type (read and write) of a processing request. The area indicating a transmission destination IP address stores an IP address of a packet transmission destination.

The data portion 141b includes an area indicating a slice ID and an area indicating processing object data. The area indicating a slice ID stores a slice ID to be a processing request object. The area indicating processing object data stores information specifying read object data and data to become a write processing object. The packet analyzing module 150 is able to acquire an IO size that is an IO unit size of each piece of data by referencing the area indicating processing object data.

FIG. 10 is a diagram illustrating a data structure example of a per-slice summary table. Per-slice summary tables 161, 162, 163, . . . are associated with respective slices and are stored in the analyzed load information storage module 160. The per-slice summary tables 161, 162, 163, . . . are generated by the packet analyzing module 150 by analyzing, with respect to a packet collection object time slot, contents of packet save files 141 stored in the packet storage module 140. The per-slice summary table 161 corresponds to the slice 211 (i.e., the segment 911). The per-slice summary table 162 corresponds to the slice 212 (i.e., the segment 914). The per-slice summary table 163 corresponds to the slice 213 (i.e., the segment 921). Subsequently, per-slice summary tables for slices up to the slice 416 are to be generated in a similar manner. In addition, it is assumed that the per-slice summary tables 161, 162, 163, . . . correspond to the packet collection time slot T1 and that each numerical value is a per-second mean value of the time slot T1. Hereinafter, while only the per-slice summary table 161 will be described, it is to be understood that a similar description shall apply to the per-slice summary tables 162, 163, . . . .

The per-slice summary table 161 is provided with an item indicating an IO size (bytes), an item indicating the number of reads (during measurement), and an item indicating the number of writes (during measurement). Pieces of information of the respective items aligned laterally are associated with each other to represent information regarding a single IO-size request.

Information indicating an IO size of processing object data is set in bytes in the item indicating an IO size (bytes). A value indicating a per-second average number of read requests acquired for a relevant IO size during the packet collection time slot T1 is set in the item indicating the number of reads (during measurement). A value indicating a per-second average number of write requests acquired for a relevant IO size during the packet collection time slot T1 is set in the item indicating the number of writes (during measurement).

For example, information containing "4" as an IO size (bytes), "14" as the number of reads (during measurement), and "3" as the number of writes (during measurement) is set in the per-slice summary table 161. This module that during the relevant time slot T1, an average of "14" read requests whose IO sizes are "4" bytes were transmitted per second and an average of "3" write requests whose IO sizes are "4" bytes were transmitted per second.

The per-slice summary table 161 also includes totals of the number of reads (during measurement) and the number of writes (during measurement) counted for each IO size.

Figure 11:
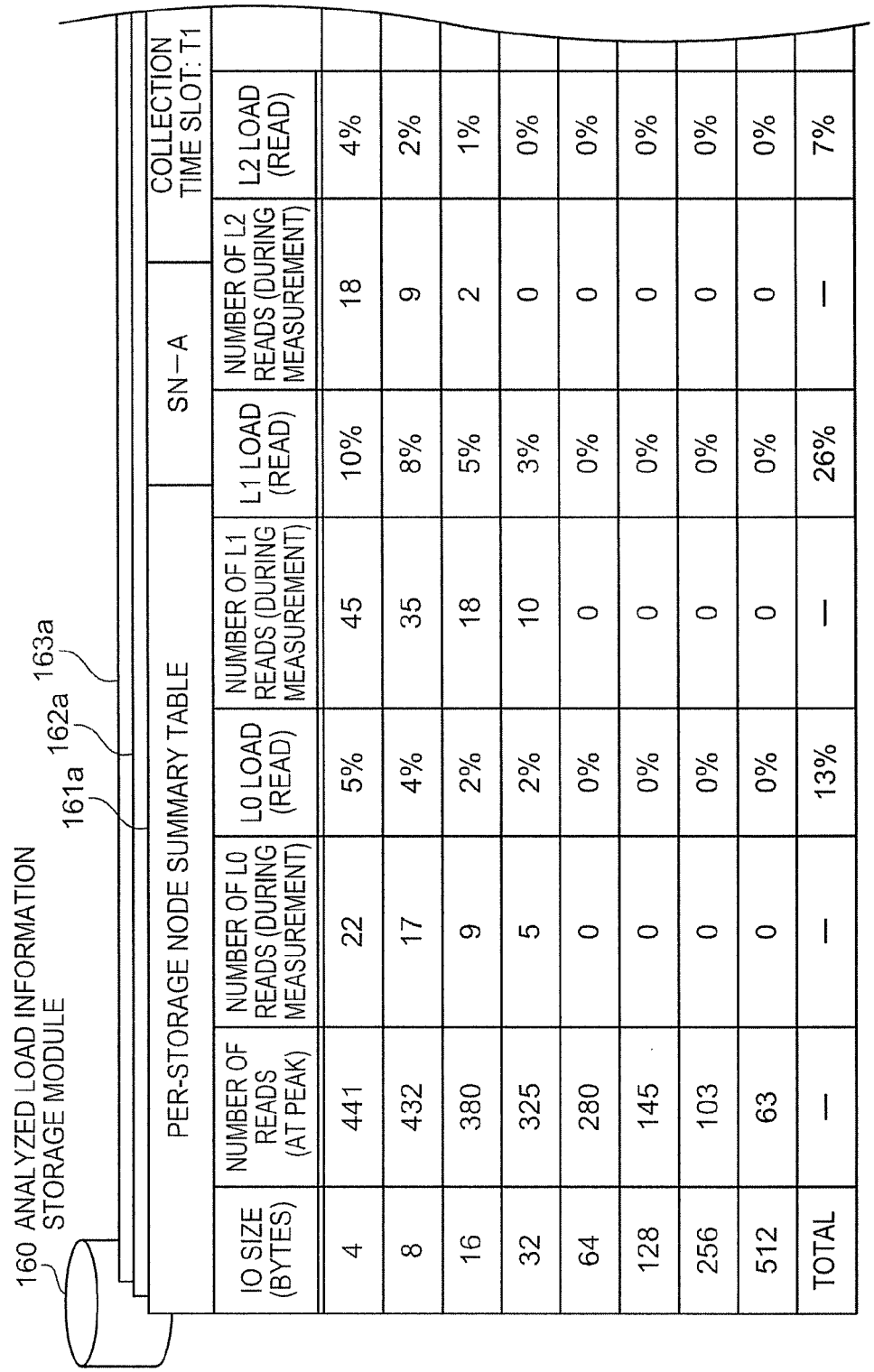
FIG. 11 is a diagram illustrating a data structure example of a per-storage node summary table.

FIGS. 11 and 12 are diagrams illustrating data structure examples of a per-storage node summary table. Per-storage node summary tables 161a, 162a, and 163a are respectively associated with the storage nodes 200, 300, and 400 and with the packet collection time slot T1, and are stored in the analyzed load information storage module 160. The per-storage node summary tables 161a, 162a, and 163a are generated by the packet analyzing module 150 based on the per-slice summary tables 161, 162, 163, . . . stored in the analyzed load information storage module 160. Hereinafter, while only the per-storage node summary table 161*a* will be described, it is to be understood that the per-storage node summary tables 162*a* and 163*a* generally share the same configuration.

The per-storage node summary table 161*a* includes: an item indicating an IO size (bytes); an item indicating the number of reads (at peak); an item indicating the number of L0 reads (during measurement); an item indicating an L0 load (read); an item indicating the number of L1 reads (during measurement); an item indicating an L1 load (read); an item indicating the number of L2 reads (during measurement); an item indicating an L2 load (read); an item indicating the number of writes (at peak); an item indicating the number of L0 writes (during measurement); an item indicating an L0 load (write); an item indicating the number of L1 writes (during measurement); an item indicating an L1 load (write); an item indicating the number of L2 writes (during measurement); an item indicating an L2 load (write); an item indicating an L0 load (read+write); an item indicating an L1 load (read+write); and an item indicating an L2 load (read+write). Pieces of information of the respective items aligned laterally are associated with each other to represent information regarding a single IO-size request.

Information indicating an IO size of processing object data is set in bytes in the item indicating an IO size (bytes).

A total of per-second average peak values of the number of reads from the logical volumes 910, 920, and 930 for a relevant IO size is set to the item indicating the number of reads (at peak). As for the peak value of the number of reads, for example, a maximum value at which a processing delay that impairs the convenience of the system does not occur at the storage node 200 is set in advance. Such a peak value is measured in advance by the packet analyzing module 150 by, for example, subjecting the storage node 200 to a maximum load before system operation is commenced.

A value indicating a per-second average number of read requests to the logical volume 910 for a relevant IO size during the time slot T1 is set in the item indicating the number of L0 reads (during measurement). Information indicating a read load on the logical volume 910 for a relevant IO size during measurement as compared to a peak thereof is set in the item indicating an L0 load (read).

A value indicating a per-second average number of read requests to the logical volume 920 for a relevant IO size during the time slot T1 is set in the item indicating the number of L1 reads (during measurement). Information indicating a read load on the logical volume 920 for a relevant IO size during measurement as compared to a peak thereof is set in the item indicating an L1 load (read).

A value indicating a per-second average number of read requests to the logical volume 930 for a relevant IO size during the time slot T1 is set in the item indicating the number of L2 reads (during measurement). Information indicating a read load on the logical volume 930 for a relevant IO size during measurement as compared to a peak thereof is set in the item indicating an L2 load (read).

A total of per-second average peak values of the number of writes to logical volumes 910, 920, and 930 for a relevant IO size is set to the item indicating the number of writes (at peak). In the same manner as the peak value of the number of reads, the peak value of the number of writes is measured in advance by the packet analyzing module 150 before system operation is commenced.

A value indicating a per-second average number of write requests made to the logical volume 910 for a relevant IO size during the time slot T1 is set in the item indicating the number of L0 writes (during measurement). Information indicating a write load on the logical volume 910 for a relevant IO size during measurement as compared to a peak thereof is set in the item indicating an L0 load (write).

A value indicating a per-second average number of write requests made to the logical volume 920 for a relevant IO size during the time slot T1 is set in the item indicating the number of L1 writes (during measurement). Information indicating a write load on the logical volume 920 for a relevant IO size during measurement as compared to a peak thereof is set in the item indicating an L1 load (write).

A value indicating a per-second average number of write requests made to the logical volume 930 for a relevant IO size during the time slot T1 is set in the item indicating the number of L2 writes (during measurement). Information indicating a write load on the logical volume 930 for a relevant IO size during measurement as compared to a peak thereof is set in the item indicating an L2 load (write).

Information indicating a total of a read load and a write load on the logical volume 910 for a relevant IO size during measurement is set in the item indicating an L0 load (read+write). Information indicating a total of a read load and a write load on the logical volume 920 for a relevant IO size during measurement is set in the item indicating an L1 load (read+write). Information indicating a total of a read load and a write load on the logical volume 930 for a relevant IO size during measurement is set in the item indicating an L2 load (read+write).

At this point, in the per-storage node summary table 161*a*, the totals of the respective load values obtained with respect to the logical volumes 910, 920, and 930 are also obtained. For example, information containing "4" bytes as the IO size (bytes) is set in the per-storage node summary table 161*a*.

In addition, information containing "441" times/second as the number of reads (at peak), "22" times/second as the number of L0 reads (during measurement), (22/441)×100="5%" as an L0 load (read), "45" times/second as the number of L1 reads (during measurement), (45/441)×100="10%" as an L1 load (read), "18" times/second as the number of L2 reads (during measurement), and (18/441)×100="4%" as an L2 load (read) is set.

Furthermore, information containing "320" times/second as the number of writes (at peak), "7" times/second as the number of L0 writes (during measurement), (7/320)×100="2%" as an L0 load (write), "20" times/second as the number of L1 writes (during measurement), (20/320)×100="6%" as an L1 load (write), "6" times/second as the number of L2 writes (during measurement), and (6/320)×100="2%" as an L2 load (write) is set.

As a result, the L0 load (read) of "5%" and the L0 load (write) of "2%" is added up and "7%" is set to the L0 load (read+write).

In addition, the L1 load (read) of "10%" and the L1 load (write) of "6%" is added up and "16%" is set to the L1 load (read+write).

Furthermore, the L2 load (read) of "4%" and the L2 load (write) of "2%" is added up and "6%" is set to the L2 load (read+write).

In this manner, IO size-specific read+write loads are calculated for the logical volumes 910, 920, and 930, and the read+write loads are further added up. Accordingly, breakdowns of the loads on the logical volumes 910, 920, and 930 may be evaluated.

As a result, in the example described above, the load on the logical volume 910 is evaluated as "20%", the load on the logical volume 920 is evaluated as "47%", and the load on the logical volume 930 is evaluated as "11%". The per-storage node summary table 161*a* represents information regarding the storage node 200. Therefore, the load on the logical volume 910 indicated by the per-storage node summary table 161*a* represents the loads on the slices 211 and 212. In a similar manner, the load on the logical volume 920 indicated by the per-storage node summary table 161*a* represents the loads on the slices 213 and 214. The load on the logical volume 930 indicated by the per-storage node summary table 161*a* represents the loads on the slices 215 and 216.

In addition, while the number of reads/writes have been indicated as an average value per unit time in the example described above so as to simplify comparison with iops to be described below, breakdowns of loads generated on the logical volumes 910, 920, and 930 may alternatively be obtained by the total number of reads/writes performed during the time slot T1.

FIG. 13 is a diagram illustrating a data structure example of a measured load table. Measured load tables 181, 182, and 183 are respectively associated with the storage nodes 200, 300, and 400 and with the information collection time slot T1, and are stored in the measured load information storage module 180. While only the measured load table 181 will be described, it is to be understood that the measured load tables 182 and 183 generally share the same configuration.

The measured load table 181 includes: an item indicating an IO size (bytes); an item indicating read iops (at peak); an item indicating read iops (during measurement); an item indicating a load (read); an item indicating write iops (at peak); an item indicating write iops (during measurement); an item indicating a load (write); and an item indicating a load (read+ write). Pieces of information of the respective items aligned laterally are associated with each other to represent information regarding a single IO-size request.

Information indicating an IO size of processing object data is set in bytes in the item indicating an IO size (bytes). A read iops peak value of the storage device 210 for a relevant IO size is set to the item indicating read iops (at peak). As for the read iops peak value, for example, a maximum value at which a processing delay that impairs the convenience of the system does not occur at the storage node 200 is set in advance. Such a peak value is measured in advance by the load measuring module 230 by, for example, subjecting the storage node 200 to a maximum load before system operation is commenced, whereby a measurement result is acquired in advance by the measured load information receiving module 170.

iops in response to read requests measured at the storage device 210 for a relevant IO size during the time slot T1 is set in the item indicating read iops (during measurement). Information indicating a read load on the storage device 210 during measurement as compared to a peak thereof is set in the item indicating a load (read).

A write iops peak value of the storage device 210 for a relevant IO size is set to the item indicating write iops (at peak). In the same manner as the read iops peak value, the write iops peak value is measured in advance by the load measuring module 230 before system operation is commenced, whereby a measurement result is acquired in advance by the measured load information receiving module 170.

iops in response to write requests measured at the storage device 210 for a relevant IO size during the time slot T1 is set in the item indicating write iops (during measurement). Information indicating a write load on the storage device 210 during measurement as compared to a peak thereof is set in the item indicating a load (write). A total of the load (read) value and the load (write) value is set in the item indicating a load (read+write).

For example, information containing "4" bytes as the IO size (bytes) is set in the measured load table 181. In addition, information is set containing "425" as the read iops (at peak), "83" as the read iops (during measurement), and (83/425)× 100="20%" as the load (read).

Furthermore, information is set containing "315" as the write iops (at peak), "25" as the write iops (during measurement), and (25/315)×100="8%" as the load (write).

As a result, the load (read) of "20%" and the load (write) of "8%" is added up and "28%" is set to load (read+write).

In this manner, IO size-specific loads are calculated from read and write iops measurement results of the storage node 200, and the loads are further added up. Accordingly, a load actually generated on the storage node 200 may be acquired.

In the example described above, the load generated on the storage node 200 may be obtained as being a "72%" load in comparison to a peak load. As for the measured load tables 181, 182, and 183, those generated by the load measuring module 230 and acquired as measured load information by the measured load information receiving module 170 are stored in the measured load information storage module 180. However, the measured load tables 181, 182, and 183 may alternatively be generated by the measured load information receiving module 170 by acquiring read iops and write iops of each IO size from the storage nodes 200, 300, and 400.

Next, details will be described on processing executed in a distributed storage system having the configurations and data structures described above. First, analyzed load information acquisition processing by the management node 100 will be described.

Figure 14:
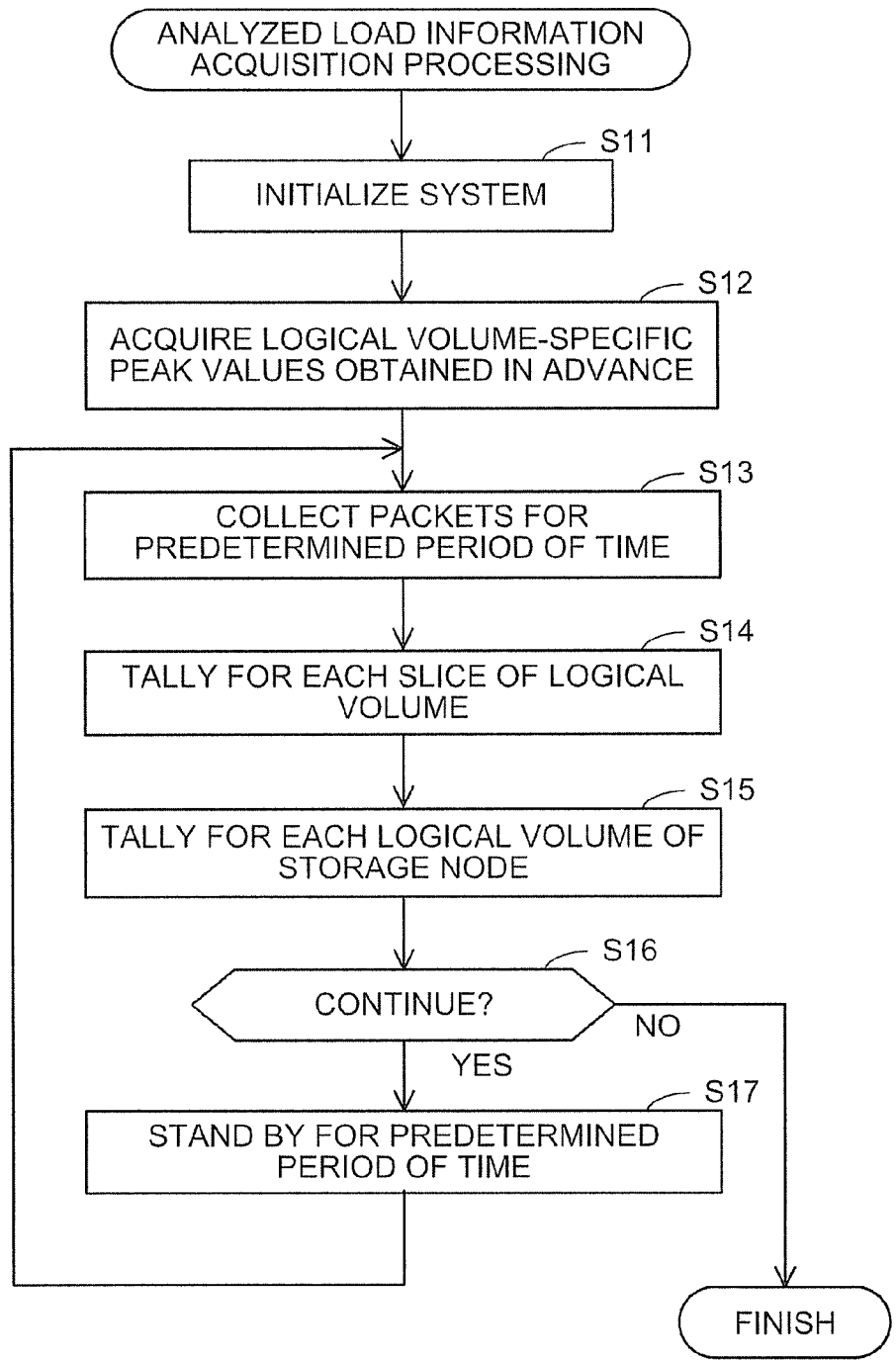
FIG. 14 is a flowchart illustrating a procedure of analyzed load information acquisition processing performed by a management node.

FIG. 14 is a flowchart illustrating a procedure of analyzed load information acquisition processing performed by a management node. Hereinafter, processing illustrated in FIG. 14 will be described according to operation numbers.

[Operation S11] The entire distributed storage system is initialized. In the process, the CPU 101 loads a predetermined program stored in the HDD 103 to the RAM 102, whereby the various functions of the management node 100 are realized.

[Operation S12] The packet analyzing module 150 acquires peak values of the number of reads and the number of writes to/from the logical volumes 910, 920, and 930 for each IO size. In this case, the respective peak values are measured in advance by the packet analyzing module 150 before the commencement of system operation in accordance with loads (read/write loads and IO size-specific loads) applied on the storage nodes 200, 300, and 400 using, for example, load-applying benchmarking software. The packet analyzing module 150 has stored the peak values measured in advance in the analyzed load information storage module 160. Therefore, the packet analyzing module 150 is able to acquire the respective peak values by referencing the analyzed load information storage module 160. The packet analyzing module 150 sets the acquired respective peak values to the per-storage node summary tables 161*a*, 162*a*, and 163*a* stored in the analyzed load information storage module 160.

[Operation S13] The packet collecting module 130 collects packets sent from the access nodes 600, 700, and 800 to the storage nodes 200, 300, and 400 from the switching device 10 during a predetermined period of time (in this case, the time slot T1). The packet collecting module 130 generates a packet save file 141 from the collected packets, and saves the packet save file 141 in the packet storage module 140.

[Operation S14] The packet analyzing module 150 generates per-slice summary tables 161, 162, 163, . . . based on the access control table 121 stored in the access information storage module 120 and on the packet save file 141 stored in the packet storage module 140. The packet analyzing module 150 is capable of referencing the header portion 141*a* of each packet to identify a time slot in which the packet had been transmitted, a read/write type, and an object storage node. The packet analyzing module 150 is also capable of referencing the data portion 141b of each packet to identify a processing object slice and an IO size. The packet analyzing module 150 stores the per-slice summary tables 161, 162, 163, . . . generated by analyzing packets in the analyzed load information storage module 160.

[Operation S15] The packet analyzing module 150 generates the per-storage node summary tables 161a, 162a, and 163a based on the per-slice summary tables 161, 162, 163, . . . stored in the analyzed load information storage module 160.

[Operation S16] The packet collecting module 130 judges whether to continue packet collection or not. When packet collection is to be continued, processing proceeds to Operation S17. When packet collection is not continued, the processing is terminated. The packet collecting module 130 is capable of making this judgment based on whether or not an administrator has specified that analyzed load information acquisition processing be continuously executed. For example, if an operation input has been made by the administrator such that analyzed load information is to be acquired by performing packet collection just once, the packet collecting module 130 judges that packet collection is not to be continuously performed. In addition, if an operation input has been made by the administrator such that analyzed load information is to be acquired by performing packet collection periodically (for example, at intervals of several minutes to several hours), the packet collecting module 130 judges that packet collection is to be continuously performed.

[Operation S17] The packet collecting module 130 stands by for a predetermined period of time (a period of time corresponding to periodical collection). Processing then proceeds to Operation S13. In this manner, the packet analyzing module 150 analyzes packets collected during the time slot T1 by the packet collecting module 130, and generates the per-slice summary tables 161, 162, 163, . . . and the per-storage node summary tables 161a, 162a, and 163a as analyzed load information.

The acquisition of analyzed load information may be performed only once or a predetermined number of times during a time slot desirable to the administrator, or may be performed periodically during system operation. When analyzed load information is to be acquired periodically, analyzed load information is to be sequentially generated in association with respective time slots beginning with the time slot T1 and followed by time slots T2, T3, T4, . . . . In addition, the acquisition of peak values in Operation S12 may be performed periodically.

Next, measured load information acquisition processing by the storage nodes 200, 300, and 400 will be described. While a description will be given below regarding the storage node 200, it is to be understood that the same processing is to be performed by the storage nodes 300 and 400.

Figure 15:
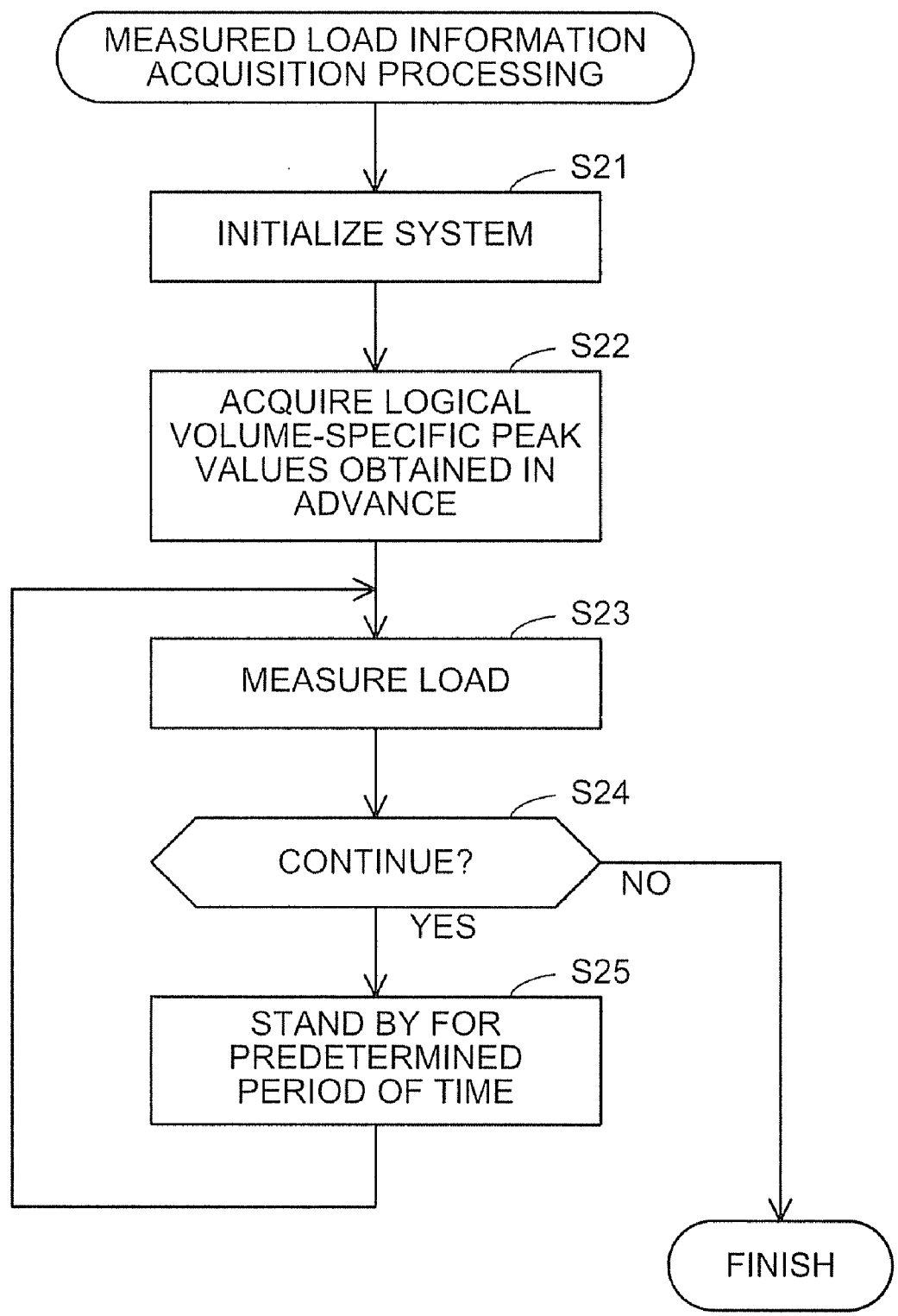
FIG. 15 is a flowchart illustrating a procedure of measured load information acquisition processing performed by a storage node.

FIG. 15 is a flowchart illustrating a procedure of measured load information acquisition processing performed by a storage node. Hereinafter, processing illustrated in FIG. 15 will be described according to operation numbers.

[Operation S21] The entire distributed storage system is initialized. In the process, the CPU 201 loads an OS or a predetermined program stored in the storage device 210 or another storage device to the RAM 202, whereby the various functions of the storage node 200 are realized.

[Operation S22] The load measuring module 230 acquires a read iops peak value and a write iops peak value of the storage device 210 for each IO size. In this case, the respective peak values are measured in advance by the load measuring module 230 before the commencement of system operation in accordance with loads (read/write loads and IO size-specific loads) applied on the storage nodes 200, 300, and 400 using, for example, load-applying benchmarking software. The load measuring module 230 then stores the measured peak loads in the storage device 210. Accordingly, the load measuring module 230 is able to acquire peak loads by referencing the storage device 210.

[Operation S23] The load measuring module 230 measures read iops and write iops at the storage device 210 during the time slot T1. The load measuring module 230 then generates a measured load table 181. The measured load table 181 is generated for each time slot during which load is measured, and is stored in, for example, a predetermined storage area of the storage device 210. Load measurement by the load measuring module 230 is to be performed in the same time slot T1 during which packet collection is to be performed by the packet collecting module 130.

[Operation S24] The load measuring module 230 judges whether to continue load measurement or not. When load measurement is to be continued, processing proceeds to Operation S25. When load measurement is not to be continued, processing is terminated. The load measuring module 230 is capable of making this judgment based on whether or not the administrator has specified that load measurement be periodically executed. For example, if an operation input has been made by the administrator at the management node 100 such that measured load information is to be acquired by performing measurement just once, the load measuring module 230 receives a notification to that effect from the management node 100 and acquires measured load information just once. In addition, if an operation input has been made by the administrator at the management node 100 such that measured load information is to be acquired periodically (for example, at intervals of several minutes to several hours), the load measuring module 230 receives a notification to that effect from the management node 100 and judges that load measurement is to be continued.

[Operation S25] The load measuring module 230 stands by for a predetermined period of time (a period of time corresponding to periodical measurement). Processing then proceeds to Operation S23.

In this manner, the load measuring module 230 measures a load generated on the storage device 210, generates the measured load table 181 as measured load information, and stores the measured load table 181 in a predetermined storage area of the storage device 210. In a similar manner, the measured load table 182 is generated for the storage node 300. Furthermore, the measured load table 183 is generated for the storage node 400.

The acquisition of measured load information may be performed only once or a predetermined number of times during a time slot desirable to the administrator so as to coincide with the time slot for analyzed load information acquisition, or may be performed periodically during system operation. When measured load information is to be acquired periodically, measured load information is to be sequentially generated in association with respective time slots beginning with the time slot T1 and followed by time slots T2, T3, T4, . . . . In addition, the acquisition of peak values in Operation S22 may be performed periodically.

Figure 16:
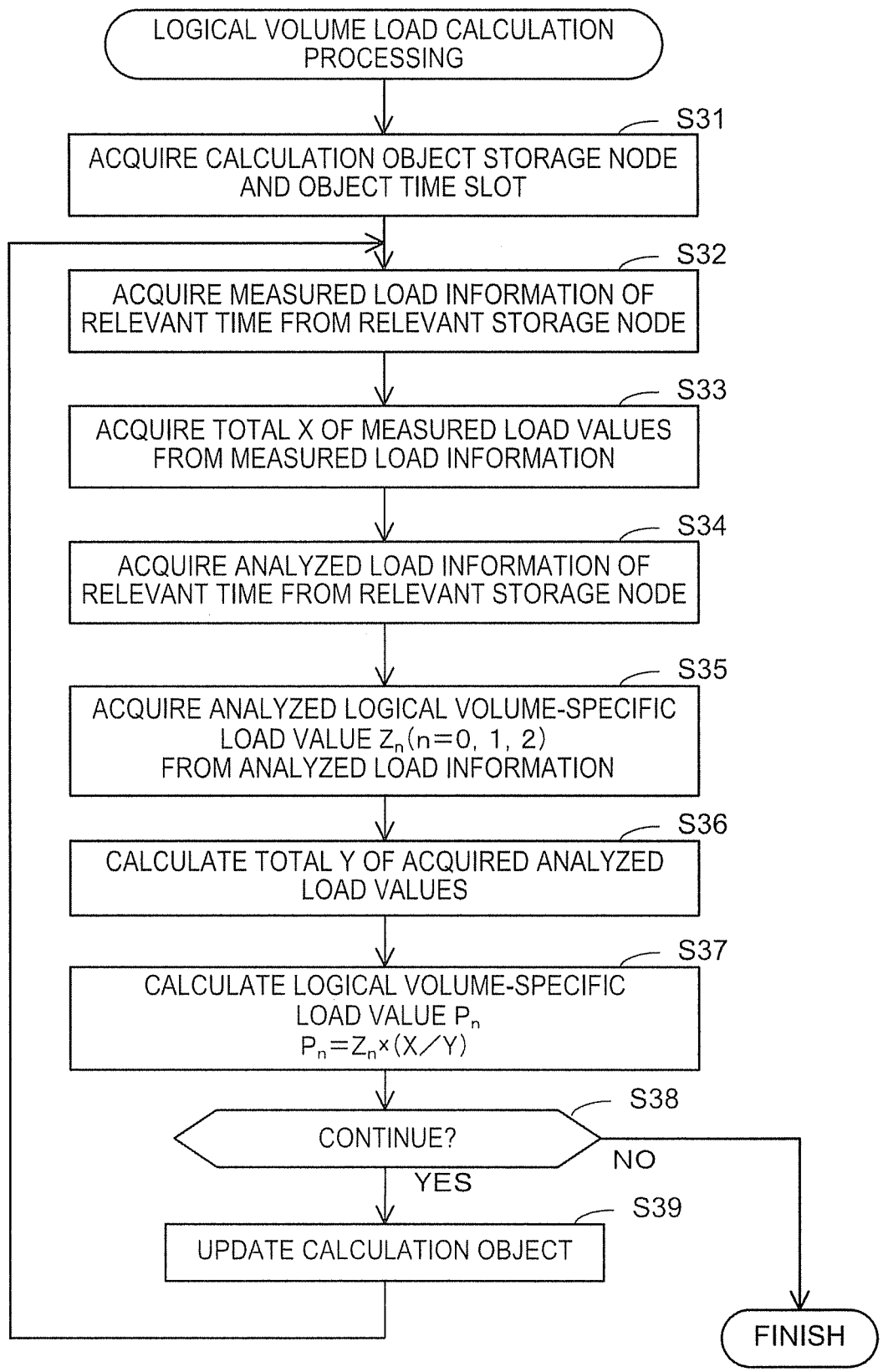
FIG. 16 is a flowchart illustrating a procedure of logical volume load calculation processing performed by a management node.

FIG. 16 is a flowchart illustrating a procedure of logical volume load calculation processing performed by a management node. Hereinafter, processing illustrated in FIG. 16 will be described according to operation numbers.

[Operation S31] The measured load information receiving module 170 acquires information indicating a measurement object storage node to be specified by a predetermined operation input by the administrator, and an object time slot. Here, it is assumed that the storage node 200 has been specified as the measurement object storage node and the time slot T1 has been specified as the object time slot.

[Operation S32] The measured load information receiving module 170 acquires the measured load table 181 for the specified time slot T1 from the specified storage node 200, and stores the measured load table 181 in the measured load information storage module 180. The measured load information receiving module 170 may alternatively be arranged so as to periodically receive measured load tables from the storage nodes 200, 300, and 400, and to store the measured load tables in the measured load information storage module 180.

[Operation S33] The logical volume load calculating module 190 acquires a measured load total X="72%" from the measured load table 181 stored in the measured load information storage module 180.

[Operation S34] The logical volume load calculating module 190 references the analyzed load information storage module 160, and acquires the per-storage node summary table 161a that is analyzed load information of the storage node 200 during the time slot T1.

[Operation S35] The logical volume load calculating module 190 acquires Z0="20%" as an analyzed load value of the logical volume 910 from the per-storage node summary table 161a. In addition, the logical volume load calculating module 190 acquires Z1="47%" as an analyzed load value of the logical volume 920. Furthermore, the logical volume load calculating module 190 acquires Z2="11%" as an analyzed load value of the logical volume 930.

[Operation S36] The logical volume load calculating module 190 calculates a total Y (=Z0+Z1+Z2) of the acquired analyzed load values Zn (n=0, 1, 2). Specifically, Y="20%"+"47%"+"11%"="78%" is obtained.

[Operation S37] Based on the measured load value X obtained in Operation S33 above and the total analyzed load value Y obtained in Operation S36 above, the logical volume load calculating module 190 corrects the analyzed load value Zn and calculates a logical volume-specific load value Pn (n=0, 1, 2). Specifically, Pn=Zn×(X/Y) is calculated. Accordingly, in the example described above, P0="18.5%", P1="43.4%", and P2="10.2%" are respectively obtained as load values of the logical volumes 910, 920, and 930.

[Operation S38] The logical volume load calculating module 190 judges whether calculations of logical volume-specific load values are to be continued or not. When calculations of load values are to be continued, processing proceeds to Operation S39. When calculations of load values are not to be continued, processing is terminated. The logical volume load calculating module 190 is able to make this judgment based on, for example, whether or not a setting for continuously calculating load values has been accepted in advance. For example, when an instruction has been issued to calculate a load value just once by a predetermined operation input by the administrator, the logical volume load calculating module 190 judges that calculations of load values are not to be continued. On the other hand, for example, when an instruction has been issued in advance to continuously calculate load values by a predetermined operation input by the administrator, the logical volume load calculating module 190 judges that calculations of load values are to be continued.

[Operation S39] The measured load information receiving module 170 accepts a predetermined operation input by the administrator and updates the information indicating a measurement object storage node and an object time slot. Processing then proceeds to Operation S32.

In this manner, the logical volume load calculating module 190 calculates logical volume-specific load values based on analyzed load information stored in the analyzed load information storage module 160 and on measured load information stored in the measured load information storage module 180. The logical volume load calculating module 190 outputs the calculation results to the load display module 195.

Calculations of the load value Pn may alternatively be continuously executed during system operation. In this case, the measured load information receiving module 170 is to update the calculation object time slot to a next time slot for the storage nodes 200, 300, and 400 in Operation S39 described above.

Figure 17:
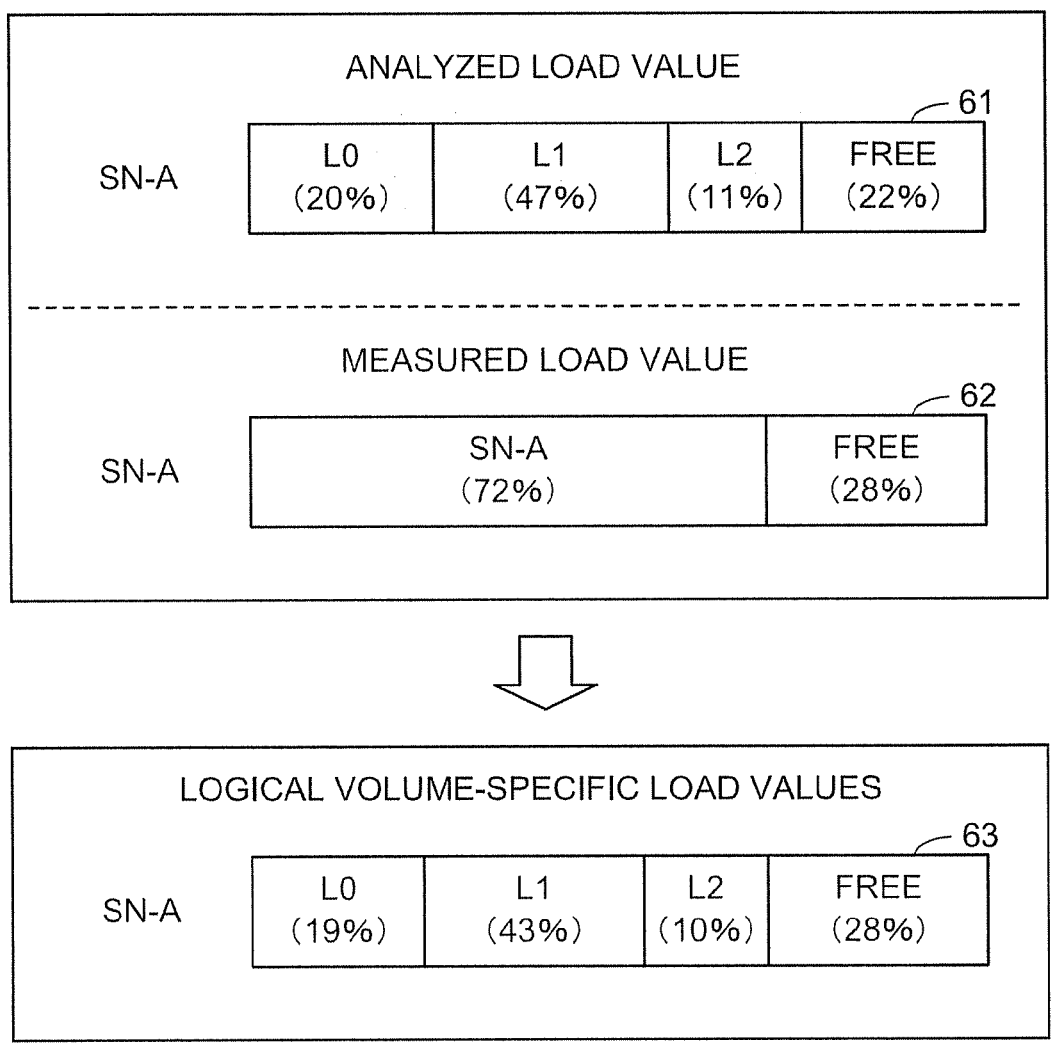
FIG. 17 is a schematic diagram illustrating a logical volume calculation processing.

FIG. 17 is a schematic diagram illustrating logical volume calculation processing. FIG. 17 exemplifies loads on the storage node 200 during the time slot T1 as compared to peaks thereof. The loads illustrated in FIG. 17 correspond to iops obtained by adding up the reads/writes from/to the storage node 200.

Graph 61 is a breakdown of loads on the logical volumes 910, 920, and 930 obtained by the packet analyzing module 150 by analyzing contents of packets in the packet save file 141 stored in the packet storage module 140. Graph 61 corresponds to results obtained from data indicated in the per-storage node summary table 161a. In graph 61, the respective analyzed load values of the logical volumes 910, 920, and 930 are shown to be "20%", "47%", and "11%".

Graph 62 represents a measured load of the storage device 210 as measured by the load measuring module 230. Graph 62 corresponds to results obtained from data indicated in the measured load table 181. In graph 62, the load value of the storage device 210 is shown to be "72%".

In this case, even when loads are estimated using packets collected from the switching device 10, it is possible that an error will occur between the estimated loads and the loads actually being generated on the storage nodes 200, 300, and 400. For example, even if a packet is transmitted from the access nodes 600, 700, and 800 to the storage nodes 200, 300, and 400, the packet may conceivably be retained in the network and require a long time to arrive at the side of the storage nodes or may end up being discarded before arriving at the side of the storage nodes. In this case, since processing of the packet is not to be executed at the storage nodes 200, 300, and 400, the analyzed load value ends up being estimated as a value greater than the load actually generated by just that much.

In contrast, the logical volume load calculating module 190 corrects an analyzed load value obtained by the packet analyzing module 150 using a load value measured by the load measuring module 230. Specifically, the logical volume load calculating module 190 adopts a measured load value as a load actually generated on the storage device 210, and obtains a breakdown of the measured load value using a ratio of the respective loads on the logical volumes 910, 920, and 930 obtained as analyzed load values.

More specifically, graph 63 is obtained from the respective load values of graphs 61 and 62. In graph 63, the respective corrected load values of the logical volumes 910, 920, and 930 are shown to be "19%", "43%", and "10%".

In this manner, the logical volume load calculating module 190 is capable of accurately obtaining the loads on the logical volumes 910, 920, and 930. The logical volume load calculating module 190 outputs the load values obtained in this manner to the load display module 195. Based on the information acquired from the logical volume load calculating module 190, the load display module 195 generates an image indicating the loads on the storage nodes 200, 300, and 400, and displays the image on the monitor 11. The administrator may monitor the loads on the logical volumes 910, 920, and 930 by viewing contents of the image displayed on the monitor 11.

Figure 18:
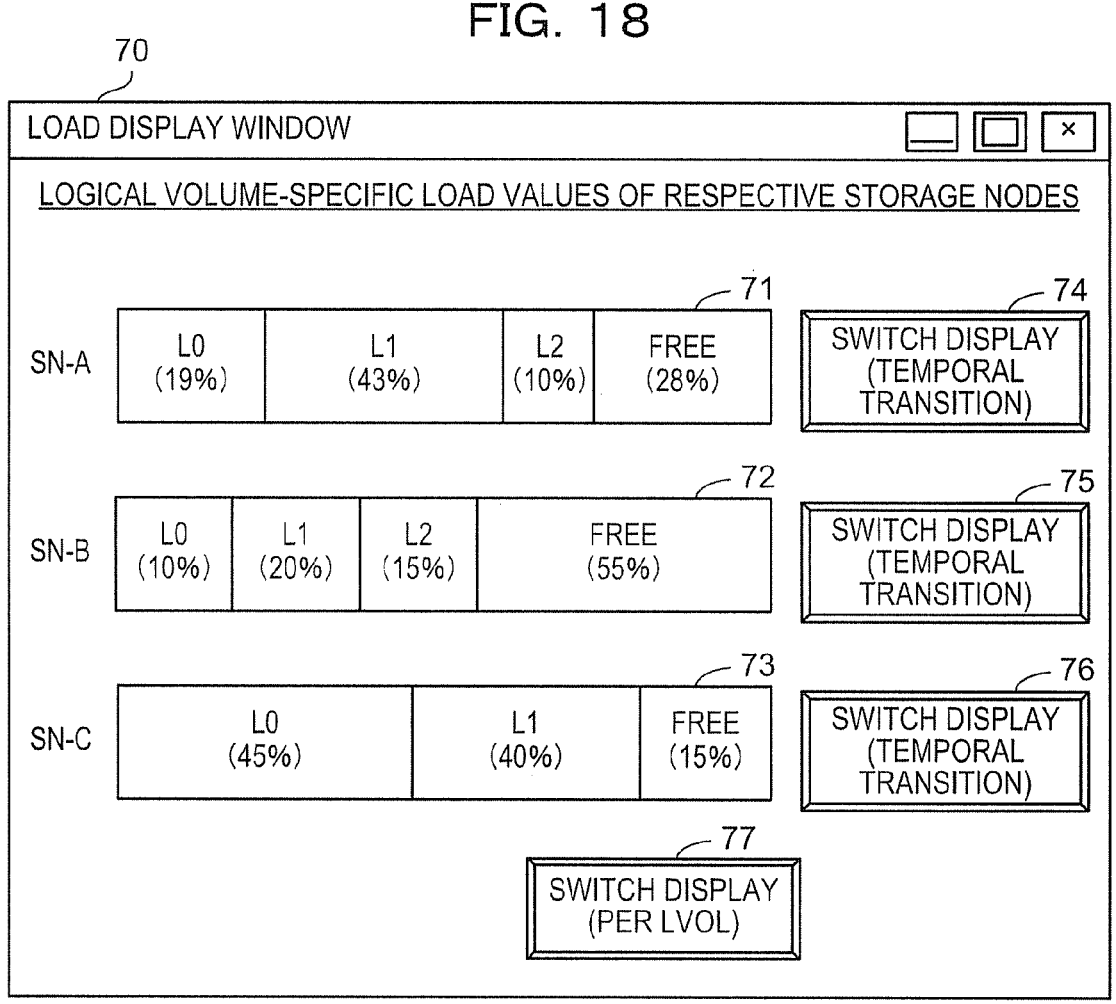
FIG. 18 is a diagram illustrating an example of a load display screen.

FIG. 18 is a diagram illustrating an example of a load display screen. A load display window 70 is generated by the load display module 195 and displayed on the monitor 11. The load display window 70 includes graphs 71, 72, and 73 and display switching buttons 74, 75, 76, and 77.

The graphs 71, 72, and 73 respectively indicate the latest corrected logical volume-specific load values of the storage nodes 200, 300, and 400. The display switching buttons 74, 75, 76, and 77 are buttons for switching display contents to other load display windows to be described in detail below. The load display module 195 detects that any of the display switching buttons 74, 75, 76, and 77 has been operated by an operation input by the administrator using the mouse 13 or the like. When the display switching buttons 74, 75, and 76 are operated, the load display module 195 switches the load display window to contents respectively indicating changes in load values over time of the storage nodes 200, 300, and 400. In addition, when the display switching button 77 is operated, the load display module 195 switches the load display window to contents indicating the respective load indexes of the logical volumes 910, 920, and 930. The "LVOL" displayed on the display switching button 77 stands for logical volume.

Figure 19:
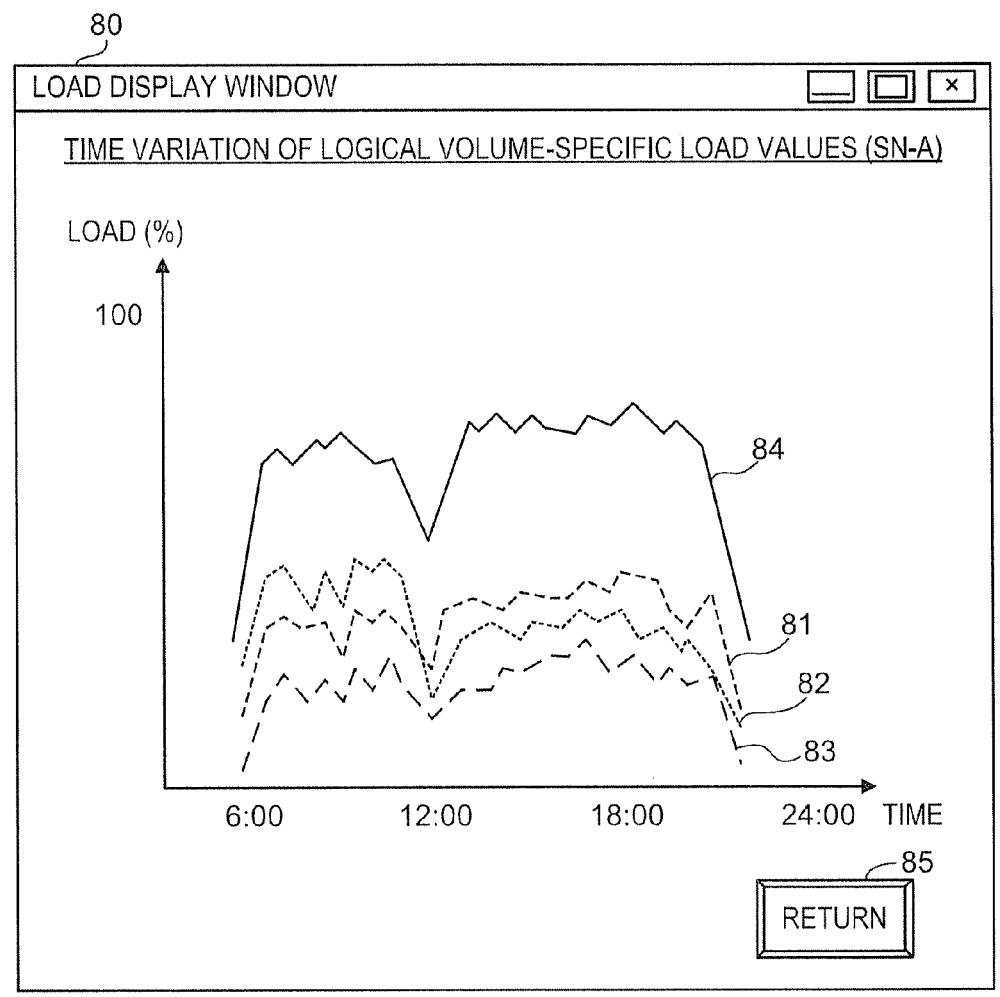
FIG. 19 is a diagram illustrating another example of a load display screen.

With the load display window 70, the administrator may monitor loads generated on the storage nodes 200, 300, and 400 together with the breakdowns of the respective logical volumes. FIG. 19 is a diagram illustrating an example of a load display screen. When the display switching button 74 is operated, a load display window 80 is generated by the load display module 195 and displayed on the monitor 11. The load display window 80 is for displaying information regarding the storage node 200. Window of similar contents to the load display window 80 are to be respectively displayed regarding the storage nodes 300 and 400 when the display switching buttons 75 and 76 are operated. The load display window 80 includes graphs 81, 82, 83, and 84 and a return button 85.

Abscissas of the graphs 81, 82, 83, and 84 represent time while ordinates thereof represent load (in %). The graphs 81, 82, and 83 illustrate temporal transitions of corrected load values of the logical volumes 910, 920, and 930. The graph 84 represents a total of the load values illustrated in graphs 81, 82, and 83 for each point in time.

The return button 85 is a button for switching display contents to the contents of the load display window 70. With the load display window 80, the administrator is able to monitor temporal transitions of loads generated on the storage nodes 200, 300, and 400, and for each logical volume, accurately monitor time slots with heavy loads, time slots with light loads, and the like.

Figure 20:
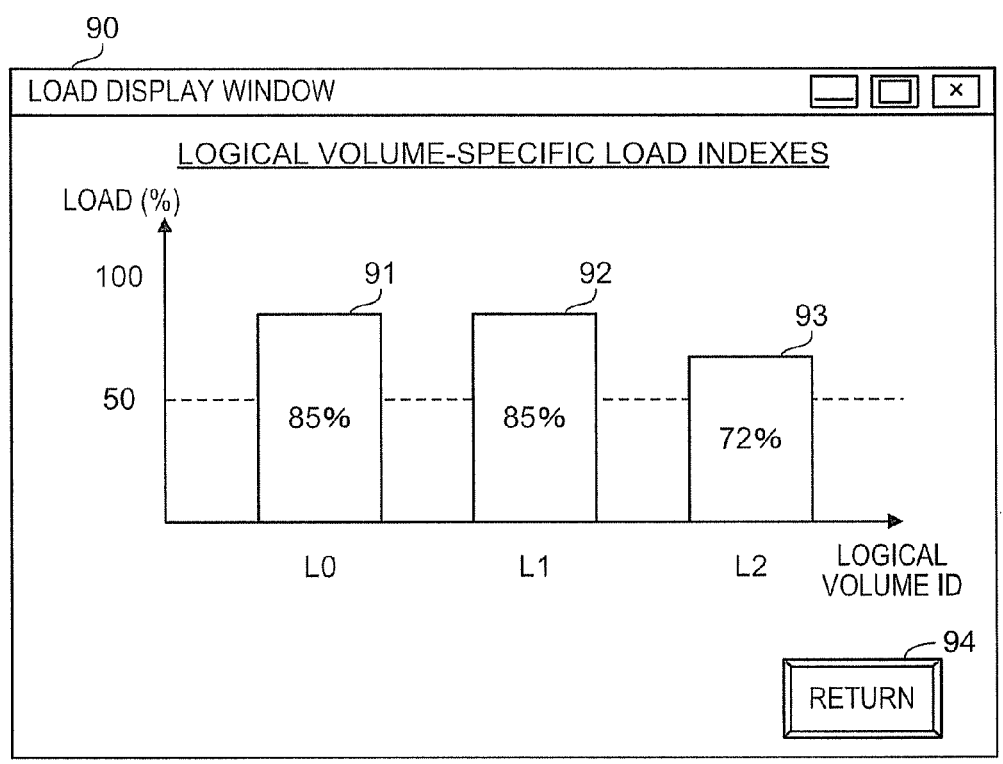
FIG. 20 is a diagram illustrating another example of a load display screen.

FIG. 20 is a diagram illustrating an example of a load display screen. When the display switching button 77 is operated, a load display window 90 is generated by the load display module 195 and displayed on the monitor 11. The load display window 90 includes graphs 91, 92, and 93 and a return button 94.

Abscissas of the graphs 91, 92, and 93 correspond to logical volume ID while ordinates thereof represent load (in %). The graphs 91, 92, and 93 illustrate respective latest load indexes of the logical volumes 910, 920, and 930.

The load indexes are determined, for example, by the load display module 195 as described below.

The load display module 195 references contents displayed in the load display window 70.

The load display module 195 extracts measured load values (corresponding to the totals of corrected load values) of the logical volumes 910, 920, and 930 in the storage nodes 200, 300, and 400. In the example of the load display window 70, the measured load values of the storage nodes 200, 300, and 400 are "72%", "45%", and "85%", respectively.

The load display module 195 sets a maximum measured load value of a storage node in which a load on a relevant logical volume is being generated as the load index of the relevant logical volume. For example, when the loads of the storage nodes 200, 300, and 400 are obtained as shown in the load display window 70, the load index of the logical volume 910 is determined as "85%", which is the measured load value of the storage node 400 (corresponds to graph 91). In addition, the load index of the logical volume 920 is determined as "85%", which is the measured load value of the storage node 400 (corresponds to graph 92). In addition, the load index of the logical volume 930 is determined as "72%", which is the measured load value of the storage node 200 (corresponds to graph 93).

In this manner, the load display module 195 determines the load indexes of the logical volumes 910, 920, and 930 by the load of a storage node acting as a bottleneck. The return button 94 is a button for switching display contents to the contents of the load display window 70.

Conventionally, monitoring logical volume-specific loads required that a large number of load indexes be measured for each storage node and that the administrator sift through the load indexes for necessary information, creating a burden on the administrator.

On the other hand, the load display module 195 consolidates logical volume-specific load indexes into a single index, generates the load display window 90, and displays the load display window 90 on the monitor 11. In other words, with the load display window 90, the administrator may readily determine loads being generated on the logical volumes 910, 920, and 930.

As described above, the management node 100 collects, from the switching device 10, processing request packets forwarded from the access nodes 600, 700, and 800 to the storage nodes 200, 300, and 400. The management node 100 then tallies up packets collected for each processing request destination logical volumes 910, 920, and 930, and calculates a breakdown of a load generated at each logical volume. Furthermore, the management node 100 acquires loads measured at the storage nodes 200, 300, and 400, and based on the acquired loads and the calculated breakdowns, evaluates the respective loads of the logical volumes 910, 920, and 930.

Accordingly, logical volume-specific loads may be readily acquired. In other words, the storage nodes 200, 300, and 400 no longer require a function for collecting logical volume-specific loads. In addition, since the function no longer need be added, the cost for adding the function is also unnecessary.

In particular, the management node 100 distinguishes and acquires data read/write requests to the logical volumes 910, 920, and 930, and sets totals thereof as load evaluation objects. Loads corresponding to such information may be readily acquired using a function provided by an OS or the like of the storage nodes 200, 300, and 400. For example, for the storage nodes 200, 300, and 400, iops generated in response to read/write requests may be associated with the logical volumes 910, 920, and 930.

As shown, since the management node 100 need only perform a calculation using packets collected from the switching device 10 and load information acquirable form the storage nodes 200, 300, and 400, system changes occurring at the storage nodes 200, 300, and 400 and the like may be minimized.

In addition, since the management node 100 is capable of identifying a physical address (slice) of a logical volume that is a packet transmission destination or a processing object by analyzing information in a predetermined head portion or a data portion provided in a packet, the management node 100 may be readily introduced.

Load information to be acquired from the storage nodes 200, 300, and 400 is not limited to iops and may be any information as long as a number of processing request (read/write and the like) packets and an association thereof such as a proportional relationship may be known from the information. For example, the present invention may utilize any other data to enables assessment of relative performance of the storage elements described herein.

The functions of the management node 100 described above may be realized by having a computer execute a program describing processing contents of such functions. The program describing processing contents may be recorded on a computer-readable recording medium. Computer-readable recording media include a magnetic storage device, an optical disk, a magneto-optical recording medium, a semiconductor memory, and the like. Magnetic storage devices include a hard disk device (HDD), a flexible disk (FD), a magnetic tape, and the like. Optical disks include a DVD (Digital Versatile Disc), a DVD-RAM, a CD-ROM (Compact Disc Read Only Memory), a CD-R (Recordable)/RW (ReWritable), and the like. Magneto-optical recording media include an MO (Magneto-Optical disc) and the like.

When distributing the program, for example, portable recording media such as DVDs, CD-ROMs, and the like recording the program are to be sold. In addition, the program may be stored in a storage device of a server computer, whereby the program is to be transferred from the server computer to another computer via a network.

The computer to execute the program stores, for example, the program recorded on a portable recording medium or the program transferred from the server computer in its own storage device. The computer then reads the program from its own storage device and executes processing in accordance with the program. Moreover, the computer may read the program directly from a portable recording medium and execute processing in accordance with the program. Alternatively, the computer may sequentially execute processing in accordance with the program every time the program is transferred from the server computer.

While a management program, a management apparatus, and a management method according to the present invention have been described based on the embodiment illustrated in the drawings, the present invention is not limited to the embodiment, and configurations of the respective modules may be replaced with any configuration as long as similar functions are included. In addition, any other component or process may be added. Furthermore, any two or more configurations (features) among the embodiment described above may be combined.

As mentioned above, the embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention, the scope of which is defined in the claims and their equivalents.

What is claimed is:

1. A computer-readable recording medium storing a management program that causes a storage system to be managed by a computer in communication with a storage node via a network, the program causing the computer to execute an operation, comprising:
    storing data handled by an access node in a plurality of storage areas associated with any of a plurality of logical volumes in the storage node, the access node and the storage node being in communication with each other via the network;
    storing a logical volume allocation information for acquiring a plurality of processing requests to each of the plurality of storage areas, and causing storing logical volume allocation information having a correspondence relationship between the plurality of storage areas and the plurality of logical volumes in the storage node;
    judging a logical volume for referencing the logical volume allocation information, and judging a logical volume corresponding to a storage area to become a processing object of each processing request; and
    calculating a processing request breakdown for counting an acquisition count of each processing request for each logical volume based on a result of the judging of the logical volume, and calculating a proportion of each acquisition count to a total of respective acquisition counts.

2. The computer-readable recording medium according to claim 1, wherein the calculating associates each proportion to each logical volume and stores each proportion in a management information storage unit, and
    the operation includes:
        acquiring a load information indicating a load generated on the storage node in response to the plurality of processing requests, and storing the acquired load information in the management information storage unit; and calculating a logical volume load value indicating a load on each logical volume based on each proportion and the load information stored in the management information storage unit.

3. The computer-readable recording medium according to claim 2,
wherein the judging of the logical volume distinguishes between data read requests and data write requests to each logical volume to judge the logical volume, and
wherein the calculating adds up a number of read requests and a number of write requests to count each acquisition count.

4. The computer-readable recording medium according to claim 3,
wherein acquiring of the load information at the storage node includes a value indicating a load based on a number of data inputs and outputs per unit time generated in response to data read requests and data write requests to the storage node.

5. The computer-readable recording medium according to claim 4,
wherein the calculating of the logical volume load calculates the logical volume load value of each logical volume by dividing a value indicating a load based on the number of data inputs and outputs per unit time included in the load information by a ratio of the respective proportions.

6. The computer-readable recording medium according to claim 1,
wherein the judging of the logical volume identifies the storage node that is a transmission destination of the processing request based on predetermined address information of the transmission destination of the processing request included in a header portion of the processing request, and identifies a logical volume that is a processing object of the processing request based on predetermined physical address information of the storage area included in a data portion of the processing request.

7. The computer-readable recording medium according to claim 2,
wherein the judging of the logical volume identifies the storage node that is a transmission destination of the processing request based on predetermined address information of the transmission destination of the processing request included in a header portion of the processing request, and identifies a logical volume that is a processing object of the processing request based on predetermined physical address information of the storage area included in a data portion of the processing request.

8. The computer-readable recording medium according to claim 3,
wherein the judging of the logical volume identifies the storage node that is a transmission destination of the processing request based on predetermined address information of the transmission destination of the processing request included in a header portion of the processing request, and identifies a logical volume that is a processing object of the processing request based on predetermined physical address information of the storage area included in a data portion of the processing request.

9. The computer-readable recording medium according to claim 4,
wherein the judging of the logical volume identifies the storage node that is a transmission destination of the processing request based on predetermined address information of the transmission destination of the processing request included in a header portion of the processing request, and identifies a logical volume that is a processing object of the processing request based on predetermined physical address information of the storage area included in a data portion of the processing request.

10. The computer-readable recording medium according to claim 2,
wherein the calculating of the processing request breakdown associates information indicating a first time slot during which the plurality of processing requests had been acquired with each proportion, and stores the information in the management information storage unit,
wherein the acquiring of the load information associates the load information with information indicating a second time slot during which the load information had been acquired and stores the load information in the management information storage unit, and
wherein the calculating of the logical volume load extracts each proportion and the load information for which the first time slot and the second time slot stored in the management information storage unit are consistent with each other to calculate the logical volume load value of each logical volume.

11. The computer-readable recording medium according to claim 3,
wherein the calculating of the processing request breakdown associates information indicating a first time slot during which the plurality of processing requests had been acquired with each proportion, and stores the information in the management information storage unit,
wherein the acquiring of the load information associates the load information with information indicating a second time slot during which the load information had been acquired and stores the load information in the management information storage unit, and
wherein the calculating of logical volume load extracts each proportion and the load information for which the first time slot and the second time slot stored in the management information storage unit are consistent with each other to calculate the logical volume load value of each logical volume.

12. The computer-readable recording medium according to claim 4,
wherein the calculating of the processing request breakdown associates information indicating a first time slot during which the plurality of processing requests had been acquired with each proportion, and stores the information in the management information storage unit,
wherein the acquiring of the load information associates the load information with information indicating a second time slot during which the load information had been acquired and stores the load information in the management information storage unit, and
wherein the calculating of logical volume load extracts each proportion and the load information for which the first time slot and the second time slot stored in the management information storage unit are consistent with each other to calculate the logical volume load value of each logical volume.

13. The computer-readable recording medium according to claim 5,
wherein the calculating of the processing request breakdown associates information indicating a first time slot during which the plurality of processing requests had been acquired with each proportion, and stores the information in the management information storage unit, wherein the acquiring of the load information associates the load information with information indicating a second time slot during which the load information had been acquired and stores the load information in the management information storage unit, and wherein the calculating of logical volume load extracts each proportion and the load information for which the first time slot and the second time slot stored in the management information storage unit are consistent with each other to calculate the logical volume load value of each logical volume.

14. The computer-readable recording medium according to claim 2, wherein the storage system is in communication with a plurality of storage nodes;

wherein the judging of the logical volume judges each logical volume of each storage node based on the plurality of processing requests;

wherein the calculating of the processing request breakdown calculates each proportion for each logical volume, associates each calculated proportion with each logical volume of each storage node, and stores each calculated proportion in the management information storage unit;

wherein the acquiring of the load information acquires the load information from each storage node and stores the acquired load information in the management information storage unit; and wherein the calculating of the logical volume load calculates the logical volume load value of each logical volume of each storage node based on each proportion and each piece of load information stored in the management information storage unit.

15. The computer-readable recording medium according to claim 3, wherein the storage system is in communication with a plurality of storage nodes;

wherein the judging of the logical volume judges each logical volume of each storage node based on the plurality of processing requests;

wherein the calculating of the processing request breakdown calculates each proportion for each logical volume, associates each calculated proportion with each logical volume of each storage node, and stores each calculated proportion in the management information storage unit;

wherein the acquiring of the load information acquires the load information from each storage node and stores the acquired load information in the management information storage unit; and wherein the calculating of the logical volume load calculates the logical volume load value of each logical volume of each storage node based on each proportion and each piece of load information stored in the management information storage unit.

16. The computer-readable recording medium according to claim 4, wherein the storage system is in communication with a plurality of storage nodes;

wherein the judging of the logical volume judges each logical volume of each storage node based on the plurality of processing requests;

wherein the calculating of the processing request breakdown calculates each proportion for each logical volume, associates each calculated proportion with each logical volume of each storage node, and stores each calculated proportion in the management information storage unit;

wherein the acquiring of the load information acquires the load information from each storage node and stores the acquired load information in the management information storage unit; and wherein the calculating of the logical volume load calculates the logical volume load value of each logical volume of each storage node based on each proportion and each piece of load information stored in the management information storage unit.

17. The computer-readable recording medium according to claim 5, wherein the storage system is in communication with a plurality of storage nodes;

wherein the judging of the logical volume judges each logical volume of each storage node based on the plurality of processing requests;

wherein the calculating of the processing request breakdown calculates each proportion for each logical volume, associates each calculated proportion with each logical volume of each storage node, and stores each calculated proportion in the management information storage unit;

wherein the acquiring of the load information acquires the load information from each storage node and stores the acquired load information in the management information storage unit; and wherein the calculating of the logical volume load calculates the logical volume load value of each logical volume of each storage node based on each proportion and each piece of load information stored in the management information storage unit.

18. The computer-readable recording medium according to claim 14, wherein the logical volume is set so as to straddle the plurality of storage nodes, and the operation includes:
displaying a load for obtaining a total of load values of each logical volume of each storage node, and
determining a maximum value among respective totals including, as a breakdown, a load of a logical volume that is a load calculation object, as a load index of the logical volume, and causing the determined load index of each logical volume to be displayed on a display device.

19. A management apparatus that manages a storage system, in which an access node and a storage node are in communication with each other via a network and data handled by the access node are stored in a plurality of storage areas associated with any of a plurality of logical volumes in the storage node, with which the management apparatus is in communication via the network, the management apparatus comprising:

a logical volume judging unit that acquires a plurality of processing requests to each of the plurality of storage areas, references a logical volume allocation information storage unit that stores a correspondence relationship between the plurality of storage areas and the plurality of logical volumes in the storage node, and judges a logical volume corresponding to a storage area to become a processing object of each processing request; and a processing request breakdown calculating unit that counts an acquisition count of each processing request for each logical volume based on a judgment result by the logical volume judgment unit, and calculates a proportion of each acquisition count to a total of respective acquisition counts.

20. A management method of a computer that manages a storage system, in which an access node and a storage node are in communication with each other via a network and data handled by the access node are stored in a plurality of storage areas associated with any of a plurality of logical volumes in the storage node, with which the computer is in communication via the network, the method comprising:

acquiring a plurality of processing requests to each of the plurality of storage areas, referencing a correspondence relationship between the plurality of storage areas and the plurality of logical volumes in the storage node, and judging a logical volume corresponding to a storage area to become a processing object of each processing request; and calculating a processing request breakdown by counting an acquisition count of each processing request for each logical volume based on a result of said judging, and calculating a proportion of each acquisition count to a total of respective acquisition counts.

* * * * *